(12) United States Patent
Ukezono

(10) Patent No.: US 9,622,039 B2
(45) Date of Patent: Apr. 11, 2017

(54) METHOD FOR RETRIEVING TOURIST INFORMATION BASED ON USER LOCATION

(71) Applicant: SONO ELECTRONICS CO. LTD., Kariya-shi, Aichi (JP)

(72) Inventor: Kunio Ukezono, Kariya (JP)

(73) Assignee: SONO ELECTRONICS CO. LTD., Kariya (JP)

( * ) Notice: Subject to any disclaimer, the term of this patent is extended or adjusted under 35 U.S.C. 154(b) by 130 days.

(21) Appl. No.: 14/412,090

(22) PCT Filed: Jul. 30, 2014

(86) PCT No.: PCT/JP2014/070067
§ 371 (c)(1),
(2) Date: Dec. 30, 2014

(87) PCT Pub. No.: WO2015/019917
PCT Pub. Date: Feb. 12, 2015

(65) Prior Publication Data
US 2016/0269866 A1    Sep. 15, 2016

(30) Foreign Application Priority Data

Aug. 5, 2013 (JP) .................................. 2013-162036

(51) Int. Cl.
*H04W 4/02* (2009.01)
*G06Q 50/14* (2012.01)
*H04L 29/06* (2006.01)

(52) U.S. Cl.
CPC ............ *H04W 4/026* (2013.01); *G06Q 50/14* (2013.01); *H04L 65/1069* (2013.01)

(58) Field of Classification Search
CPC ....... H04W 64/00; H04W 4/02; H04W 4/026; H04L 29/08657; G01S 5/0252; G01S 5/02
(Continued)

(56) References Cited

U.S. PATENT DOCUMENTS 8,127,139 B2 * 2/2012 Brundage ........... G06F 21/6209
380/258
8,954,860 B1 * 2/2015 Hands ............... G06F 17/30873
715/738

(Continued)

FOREIGN PATENT DOCUMENTS

EP    1840762 A1    10/2007
JP    2002-132806 A    5/2002
(Continued)

OTHER PUBLICATIONS

Aug. 29, 2013 Office Action issued in Japanese Application No. 2013-162036.
(Continued)

*Primary Examiner* — Cong Tran
(74) *Attorney, Agent, or Firm* — Oliff PLC

(57) ABSTRACT

There is provided a technology for retrieving tourist information based on a user location which makes it easy for the user to retrieve accurate tourist information which she/he truly requires. A user's location on the map is measured and the plurality of reference areas are retrieved from memory storing a plurality of reference areas RA, RB, RC and RD allocated to a plurality of target objects A, B, C and D on the map which are correlated with a plurality of tourist information items, using the measured current location as a search key. A reference area including the measured current location is extracted from plurality of reference areas and tourist information, from plurality of tourist information items corresponds to the extracted reference area is provided (Continued)

to the user. Each reference area is defined by location, shape and size of area reflecting the attributes of corresponding target objects on the map.

5 Claims, 18 Drawing Sheets

(58) Field of Classification Search
USPC .................. 455/404.2, 456.1–6, 457, 414.1
See application file for complete search history.

(56) References Cited

U.S. PATENT DOCUMENTS

| | | |
|---|---|---|
| 2002/0099769 A1 | 7/2002 | Yasui et al. |
| 2002/0103781 A1 | 8/2002 | Mori et al. |
| 2002/0103911 A1 | 8/2002 | Meifu et al. |
| 2005/0210021 A1* | 9/2005 | Miyazaki .......... G06F 17/30241 |
| 2007/0088497 A1* | 4/2007 | Jung ................. G01C 21/3647 348/113 |
| 2011/0063301 A1* | 3/2011 | Setlur .................... G06T 17/05 345/441 |
| 2011/0280108 A1 | 11/2011 | Honda |
| 2013/0038635 A1* | 2/2013 | Bales .................. G01C 21/367 345/660 |
| 2013/0339891 A1* | 12/2013 | Blumenberg .......... G01C 21/26 715/771 |
| 2014/0195218 A1* | 7/2014 | Takaoka ................ G06F 17/289 704/2 |

FOREIGN PATENT DOCUMENTS

| | | |
|---|---|---|
| JP | 2002-216021 A | 8/2002 |
| JP | 2002-229991 A | 8/2002 |
| JP | 2002-229992 A | 8/2002 |
| JP | 2002-232935 A | 8/2002 |
| JP | 2003-150616 A | 5/2003 |
| JP | 2004-062428 A | 2/2004 |
| JP | 2005-150941 A | 6/2005 |
| JP | 2011-237314 A | 11/2011 |
| WO | 2006/059629 A1 | 6/2006 |
| WO | 2008039935 A2 | 4/2008 |
| WO | 2008093935 A1 | 8/2008 |

OTHER PUBLICATIONS

Jan. 15, 2014 Office Action issued in Japanese Application No. 2013-162036.
Aug. 26, 2014 Search Report issued in International Application No. PCT/JP2014/070067.
Aug. 26, 2014 Written Opinion of the International Searching Authority issued in International Application No. PCT/JP2014/070067.
Oct. 19, 2015 Extended European Search Report issued in European Application No. 14815213.5.
Dec. 22, 2015 Extended European Search Report issued in European Application No. 14815213.5.
Feb. 18, 2016 International Preliminary Report on Patentability issued in International Application No. PCT/JP2014/070067.
Oct. 26, 2016 Office Action issued in European Patent Application No. 14815213.5.

* cited by examiner

FIRST EXAMPLE OF CLUSTER DATA (a)

| BLOCK | PARTITION AREA | CLUSTER |||
| --- | --- | --- | --- |
| | | ELEMENT DATA SET ||
| | | REFERENCE AREA | TOURIST INFORMATION |
| No.1 | D1 | | |
| | | | |
| | | | |
| | | | |
| | | | |

(b)

SECOND EXAMPLE OF CLUSTER DATA (a)

| BLOCK | PARTITION AREA | CLUSTER | |
|---|---|---|---|
| | | ELEMENT DATA SET | |
| | | REFERENCE AREA | TOURIST INFORMATION |
| No.1 | D1 | | |
| | | | |
| | | | |
| No.2 | D2 | | |
| | | | |
| | | | |
| No.3 | D3 | | |
| | | | |
| | | | |

TERMINAL DATA BASE

| REFERENCE AREA | | TOURIST INFORMATION |
|---|---|---|
| (x1, y1) | (x2, y2) | |
| | | |
| | | |
| | | |
| ⋮ | ⋮ | ⋮ |

FIG. 15

| BLOCK | PARTITION AREA | CLUSTER |||||||
|---|---|---|---|---|---|---|---|---|
| | | ELEMENT DATA SET |||||||
| | | REFERENCE AREA | TOURIST INFORMATION |||||||
| | | | AZIMUTH ANGLE |||||||
| | | | 0° | 45° | 90° | 135° | 180° | ... | 315° |
| No.1 | D1 | | | | | | | | |
| | | | | | | | | | |
| | | | | | | | | | |
| | | | | | | | | | |
| | | | | | | | | | |

METHOD FOR RETRIEVING TOURIST INFORMATION BASED ON USER LOCATION

TECHNICAL FIELD

The present invention relates to a technology for retrieving local tourist information based on and suitable for a user location on the map.

BACKGROUND ART

In recent years, many countries have been experiencing a strong tendency to become tourist-oriented countries. Becoming a tourist-oriented country is an important issue from the point of view of encouraging the revival of a nation as well as invigoration of local communities and the tourist industry could become one major industry in each country.

To achieve this, development of infrastructures for tourist areas as well as improvement of services provided to tourists become very important too.

Development of infrastructures may include for instance addition/development of access to tourist areas as well as addition/development of amenities for tourist areas.

On the one hand, improvement of services may include advertising of tourist areas to the people who live in other areas, wide distribution of tourist guides as well as maps to tourists in tourist areas, as well as wide distribution/diffusion of guide information with respect to suggestions for recommended tours for sightseeing a plurality of spots in a tourist area, and with respect to various target objects in the tourist area specifically sightseeing resources (for instance, establishments, buildings, exhibits, cityscape, land forms (mountains, sea, rivers, lakes, straits, valleys, plains, harbors, etc.), animal life, vegetable life, historical sites, places of scenic beauty, traditional arts, folklore, events, etc.) which are specific to that area.

Thus, wide diffusion of geographical information with respect to tourist areas, historical/scientific information with respect to the respective target objects within the tourist areas, information regarding tourist routes as well as information on tourist valuation of such tourist areas (hereinafter collectively referred to as "tourist information") becomes very important in revitalizing tourist industry. The tourist information is provided to the tourists in the form of text, image (still image, video picture) or voice, etc.

On the other hand, thanks to the rapid progress of information and communication technology, it is common sense for tourists to travel while carrying a communications device capable of communication with the outside. Such communications devices are also referred to as user portable terminals and are classified into portable telephones, smart phones, PDAs, tablet PCs, etc. Also, it is very common for this type of communications devices to have a built-in camera function or a positioning function (for instance, GPS function, etc., location measurement function, azimuth angle measurement function, attitude measurement function).

Thus, in recent years, the use of user portable terminals has made it possible for tourists to receive useful tourist information from the outside as needed, while sightseeing.

Nevertheless, the amount of tourist information which can be accessed by a tourist using a user portable terminal is enormous. Thus, when the tourist has to retrieve tourist information by selecting a retrieve key himself/herself and entering the information in the user portable terminal by himself/herself, the retrieval operation takes time and effort and is therefore inconvenient. Furthermore, selection of an incorrect retrieval key can make it impossible to retrieve the appropriate tourist information.

Thus, in order to provide an improved user portable device which is easy to use by a user, in this case a tourist, it is necessary to develop a technology for retrieving local tourist information suitable for the current tourist area, which is either completely or partially automatic, by eliminating the user's involvement as much as possible.

In this context, a variety of technologies have already been proposed for automatic retrieval of local tourist information suitable for a tourist's current location. These retrieval technologies are classified into location-based retrieval method, vision-based retrieval method and a hybrid retrieval method incorporating the first two methods (for instance, refer to Patent Literature 1).

According to the location-based retrieval method, a tourist's current location is first measured and then retrieval of tourist information is carried out based on the current location as measured. More specifically, a tourist area which satisfies the conditions relating to the distance to the current location as measured is extracted from a plurality of candidate tourist areas and presumed to be the current tourist area for the tourist. Then, the tourist information which was correlated in advance with the extracted tourist area is provided to the tourist as the most suitable tourist information.

On the other hand, according to the vision-based retrieval method, the target object onto which the tourist is currently focusing is recognized spatially and retrieval of tourist information is carried out based on a three dimensional shape of the target object thus recognized. More specifically, a target object having a three dimensional shape which is identical with the three dimensional shape of the target object which was recognized spatially is extracted from the plurality of candidate target objects and is presumed to be the current target object for the tourist. Then, the tourist information which was correlated in advance with the extracted target object is provided to the tourist as the most suitable tourist information.

[Patent Literature 1] Japanese Patent Application Laid Open No. 2003-150616

DISCLOSURE OF THE INVENTION

Problems to be Solved by the Invention

However, use of the conventional vision-based retrieval method presents a lot of various problems and constraints which need to be solved.

For instance, use of this method requires spatial recognition of the target object each time an attempt to retrieve target tourist information is made. Also, computation of spatial recognition requires a long processing time (computation time as well as transmission time), even when carried at high speed. Thus, it is likely that a tourist may not acquire target tourist information in a timely fashion.

Also, when using this method, it is difficult to browse through the images captured by the tourist for the purpose of spatial recognition of a target object if the captured images are composite images of the target object and another object and the target object needs to be separated from the other object for such recognition.

Furthermore, when using this method it is difficult to capture images of the target object in some environmental conditions with low visibility such as bad weather or nighttime, etc., making it impossible to carry out so much as spatial recognition of the target object.

Furthermore, when using this method, the target tourist information is retrieved depending on the three dimensional geometry of the target object. Therefore, while the target object may be the same, if the target object has been reconstructed or is under construction, the three dimensional geometry of the captured target object may be inconsistent with the three dimensional geometry of the original target object which makes it impossible to correctly recognize the target object.

With respect to this, in the conventional location-based retrieval method, a plurality of shortest distances between the measured current location of the tourist as well as a plurality of candidate tourist areas, respectively, are calculated, and the candidate tourist area having the lowest value amongst the plurality of calculated shortest distances is presumed to be the current tourist area for the tourist.

Thus, when the current tourist area for the tourist is estimated while focusing only on the distance to the current location of the tourist, it is difficult to accurately estimate which candidate tourist area is the current tourist area in a region where a plurality of candidate tourist areas are located in close proximity to one another. Furthermore, this makes it difficult to retrieve accurate tourist information that the tourist truly needs.

The present invention has been made in view of the above-described problems and an object thereof is to provide a technology for retrieving local tourist information based on user location, namely a solution for easy retrieval of accurate tourist information as truly required by the user.

Means for Solving the Problems

The following aspects can be considered with respect to the present invention. Each aspect is described in a separate paragraph, with each paragraph being numbered and numbers of other paragraphs being quoted as required. This is for the purpose of facilitating understanding of a portion of the technical features and combinations thereof as employed by this invention. The technical features as well as combinations thereof as employed by this invention should not be construed as being limited to the following aspects. Specifically, while not being mentioned in the following aspects, it should be construed that this does not prevent extraction and employment of the technical features described in this description as technical features of the present invention, as appropriate.

Furthermore, each paragraph is described while quoting a number(s) of another(other) paragraph(s), however this is not necessarily construed as impeding separation of the technical features described in each paragraph from the technical features described in the other paragraph(s) for independent use. This should be construed as being possible to use the technical features described in each paragraph independently as appropriate, in accordance with their nature.

(1) To achieve the object of the present invention, there is provided a method for retrieving tourist information based on a user's current location, comprising:

measuring a user's current location on a map;

retrieving, from a memory storing a plurality of reference areas allocated to a plurality of target objects on the map as correlated with a plurality of tourist information items, the plurality of reference areas using the user's current location measured by the measuring as a search key;

extracting a reference area from the plurality of reference areas which includes the current location; and providing to a user tourist information from the plurality of tourist information items which corresponds to the reference area which is extracted by the extracting;

wherein each of the reference area is defined by a location, shape and size of area on the map reflecting the attributes of the corresponding target object.

In this method, retrieval of the target tourist information focuses on the relationship between a user's current location and the plurality of reference areas allocated in advance to the plurality of target objects.

Furthermore, in this method, each of the reference area can change as far as at least one aspect from amongst the location, shape and size. Accordingly, each of the reference area is thus set so as not to coincide with at least one other reference area as far as at least one aspect from a group of aspects including location, shape and size.

Accordingly, each of the reference area is set while being correlated with a corresponding target object and at this time, at least one aspect from amongst the location, shape and size of each reference area can be freely set in advance in accordance with the attributes of the corresponding target object.

Thus, according to this method, the attributes of the target object are reflected in the location, shape and size of each reference area and can be incorporated as attributes of that reference area. Then, when a reference area suitable for the user's current location is retrieved from a plurality of reference areas, the attributes of the corresponding target object are considered in terms of the location, shape and size of each reference area.

As a result, according to this method, in spite of employing the location-based retrieval method, retrieval of the target tourist information can also be carried out by considering additional attributes of the target object other than geographical location. This improves accuracy in retrieving the target tourist information.

Furthermore, according to this method, retrieval of target tourist information requires less time as spatial recognition of the target object which is the focus of the user is no longer required.

This method may be implemented either in a user portable terminal or in a server, for instance, but is not limited to these two cases. In the former case, the user portable terminal employs a memory adapted for storing in advance a plurality of candidate tourist information items including the target tourist information or a memory adapted for storing, at least temporarily, the candidate tourist information downloaded from an outside device (for instance, server) as required. In the latter case, the server retrieves the target tourist information from the plurality of candidate tourist information items in response to a request from the user portable terminal and sends it to the user portable terminal.

(2) There is provided the method for retrieving tourist information according to paragraph (1), wherein each of the reference area has a geometrical inclusion/non-inclusion relationship with other reference areas on the map, and this inclusion/non-inclusion relationship shows the inclusion relationship amongst the plurality of target objects.

In this method, the inclusion relationship relationship amongst the plurality of target objects on the map is expressed by a plurality of reference areas. More specifically, each of these reference areas is characterized by location, shape and size as well as a geometrical inclusion/non-inclusion relationship with the other reference areas on the map. The inclusion/non-inclusion relationship between the reference areas expresses the inclusion relationship amongst the plurality of target objects.

More specifically, in this method, the inclusion relationship amongst the plurality of target objects is the inclusion relationship amongst the target objects in real space. By comparison, assuming the inclusion/non-inclusion relationship amongst the plurality of reference areas is expressed as the inclusion relationship amongst the target objects in virtual space, the inclusion relationship amongst the target objects in real space is expressed as the inclusion relationship amongst the target objects within a virtual space which can be set as one desires. This inclusion relationship amongst the target objects within a virtual space is used to retrieve the desired target objects and ultimately, to retrieve the target tourist information.

(3) There is provided the method for retrieving tourist information according to paragraph (2) wherein:

the inclusion relationship includes a complete inclusion relationship wherein one reference area is geometrically completely encompassed inside another reference area and the complete inclusion relationship is that one of two corresponding target objects belongs to the other;

the non-inclusion relationship includes a complete non-inclusion relationship wherein one reference area does not either partially or entirely geometrically overlap with any other reference area and the complete non-inclusion relationship is that two corresponding target objects do not belong to each other.

(4) There is provided the method for retrieving tourist information according to paragraph (3), wherein the inclusion/non-inclusion relationship does not include a partial inclusion relationship wherein one reference area partially overlaps geometrically with other reference area(s);

in the extracting, if more than one reference areas including the current location are extracted from the plurality of reference areas as temporary reference areas, and a temporary reference area with s smallest size of area is selected from the temporary reference areas as a final reference area; and in the providing, tourist information from the plurality of tourist information items which corresponds to the final reference area is provided to the user.

The method according the aforementioned paragraph (3) can be implemented with the inclusion relationship including the aforementioned complete inclusion relationship as well as a partial inclusion relationship, whereby one reference area geometrically overlaps partially with another reference area.

However, when employing this aspect, when two reference areas with the same current location are simultaneously extracted as temporary reference areas, respectively, for instance, these temporary reference areas can be not only in a complete inclusion relationship, but also in a partial inclusion relationship. If these temporary reference areas are in a partial inclusion relationship, one of two corresponding target objects can belong to the other, or otherwise the two corresponding target objects may have no relationship to each other. Thus, additional information as well as the user's intervention is required in order to automatically determine which one of the temporary reference areas is the proper reference area.

On the other hand, when the method according to the aforementioned paragraph (3) is implemented so that the inclusion relationship includes complete inclusion but does not include partial inclusion, if two reference areas sharing the same current location are extracted at the same time as respective temporary reference areas, these temporary reference areas are necessarily in a complete inclusion relationship. Therefore, this expresses the fact that one of the two corresponding target objects belongs to the other.

In this case, another embodiment of the invention is proposed wherein it is assumed that the plurality of tourist information items corresponding to these temporary reference areas represent a plurality of candidate tourist information items for the one item of tourist information truly required by the user. Thus, all the candidate tourist information items are provided to the user, and thereafter, the user is urged to select one item of information from all the candidate tourist information item.

However, this embodiment requires the user's intervention in refining the tourist information.

On the other hand, another embodiment may be employed where two reference areas sharing the same current location are simultaneously extracted as the respective temporary reference areas, with these temporary reference areas being inevitably in a complete inclusion relationship, which expresses the fact that one of the two corresponding target objects belongs to the other area. This means that smaller-sized temporary reference areas represent reference areas corresponding to target objects which are closer to the user's current location.

Focusing on this aspect, according to the method in this paragraph, if a plurality of reference areas sharing the user's current location are extracted, a reference area with a smallest size is automatically selected from amongst the reference areas as a final reference area and the tourist information, from amongst the plurality of tourist information items, as corresponding to the selected reference area is provided to the user. As a result, tourist information can be refined without requiring the user's intervention, making it more convenient for the user.

(5) There is provided the method for retrieving tourist information according to any paragraphs from (1) through (4), wherein:

in the measuring, a current azimuth angle of the user on the map is also measured;

the tourist information from the plurality of tourist information items which is correlated to each of the plurality of reference areas includes a plurality of azimuth angle specific tourist information items which are correlated to a plurality of azimuth angles; and in the providing, azimuth angle specific tourist information, from the plurality of azimuth angle specific tourist information items as correlated to the reference area which is extracted by the extracting, which corresponds to a current azimuth angle of the user on the map is provided to a user.

Identifying the user's current azimuth angle in addition to the user's current location makes it easier to accurately estimate the target object the user is currently showing an interest in.

Based on this insight, according to this method, a plurality of tourist information items are correlated with each reference area for each azimuth angle, and the tourist information corresponding to the user's current azimuth angle is selected from the plurality of azimuth angle specific tourist information items which are correlated with the reference area extracted in accordance with the user's current location and is then provided to the user.

(6) There is provided a method for retrieving tourist information based on a user's current location, comprising:

measuring a user's current location on a map;

retrieving, from a memory storing a plurality of reference areas allocated to a plurality of target objects on the map as correlated with a plurality of tourist information items, the plurality of reference areas using the user's current location measured by the measuring as a search key;

extracting a reference area from the plurality of reference areas which includes the current location; and providing to a user tourist information from the plurality of tourist information items which corresponds to the reference area which is extracted by the extracting; wherein each of the reference area is set so as not to coincide with at least one other reference area with respect to at least one parameter from location, shape and size.

(7) There is provided a program to be executed by a computer for carrying out the method for retrieving tourist information according to any of paragraphs (1) through (6).

The program according to this paragraph can be construed, for instance, as a combination of instructions to be executed by a computer to perform some functions, or can also be construed not only as a combination of instructions but also as including files and data to be processed in accordance with these instructions. Nevertheless, the program is not limited to this aspect alone.

Also, this program can be executed by a computer independently to achieve an expected objective, or can also be executed by a computer together with other programs to achieve an expected objective. Nevertheless, the program is not limited to this alone. In the latter case, the program according to this paragraph can be designed to use mainly data, however, this is not limited to this aspect alone.

(8) There is provided a recording medium for storing the program according to paragraph (7) in a computer readable format.

A variety of media can be adopted as recording medium, for instance, magnetic recording media such as floppy disk, etc., optical recording media such as CD, CD-ROM, etc., magneto-optic recording media such as MO, nonremovable storage media such as ROM, however, this is not limited to this aspect.

(9) There is provided a tourist information retrieval device for retrieving tourist information based on a user's current location, comprising:

a measuring unit for measuring a user's current location on a map;

an extraction unit for retrieving, from a memory storing a plurality of reference areas allocated to a plurality of target objects on the map as correlated with a plurality of tourist information items, the plurality of reference areas using the user's current location measured by the measuring unit as a search key to extract a reference area from the plurality of reference areas which includes the current location; and a providing unit of providing to a user tourist information from the plurality of tourist information items which corresponds to the reference area which is extracted by the extraction unit;

wherein each of the reference area is defined by a location, shape and size of area which reflect the attributes of the corresponding target object on the map.

(10) There is provided a user portable terminal for providing tourist information to a user based on a user's current geographical location, comprising:

a positioning sensor for measuring a current location of the user portable terminal on a map;

a memory capable of storing a plurality of reference areas allocated to a plurality of target objects, respectively, on the map, which are correlated with a plurality of tourist information items; and a controller for controlling the positioning sensor and the memory;

wherein the controller comprises:

a measuring unit for measuring the current location using the positioning sensor either automatically or in response to a user's command with respect to the user portable terminal;

an extraction unit for retrieving the plurality of reference areas from the memory, using the current location as measured as a search key and extracting, from the plurality of reference areas, a reference area including the current location as measured; and a providing unit for providing tourist information, from the plurality of tourist information items, which corresponds to the reference area as extracted;

wherein each of the reference area is defined by a location, shape and size which reflect the attributes of the corresponding target object on the map.

Here, one example of a "command" may include direct commands, specifically requests from the user desiring to acquire tourist information suitable for the user's current location, or requests from the user desiring to update the tourist information.

Another example of a "command" may include indirect commands. One example of indirect commands may include a user's action which triggers an image capture operation for the case when the user portable terminal has a built-in image capture function, also called image capture operation. The image capture operation may include an operation where the user operates an actual or virtual shutter button, or an operation where the user taps the screen of the user portable terminal.

The user portable terminal according to this paragraph can be implemented so as to measure the user's current location in response to a user's image capture operation, retrieve the tourist information suitable for that current location and provide the tourist information thus retrieved to the user.

In case of adopting this aspect, the user can acquire local tourist information suitable to his/her current location, specifically tourist information suitable for the tourist area or target object simply by expressing his/her intention to capture an image of an arbitrary target object in such arbitrary tourist location as a photographic subject, without voluntarily requesting such.

Furthermore, it is common to think that immediately after the user has captured an image of a specific target object as a photographic target, the user may also want to simultaneously acquire other information pertaining to the captured target object (such as for instance, historical information, comments about that target object as made by other tourists, other target objects historically correlated with the concerned target object). Thus, according to this aspect, the user can acquire the target tourist information in a timely fashion.

According to this aspect, convenience in using the user portable terminal is improved as compared to the case where the user is required to carry out a separate operation from the image capture operation to acquire this tourist information.

Furthermore, as compared to the case where a separate aspect is adopted wherein, while in power on mode, a series of operations are executed automatically in a user portable terminal, specifically, a series of operations including the aforementioned measuring, retrieval and provision operations are executed periodically, this aspect is more likely to be implemented without uselessly carrying out the aforementioned series of operations. This decreases the computation load in the user portable terminal as well as helps reduce power consumption.

BRIEF DESCRIPTION OF THE DRAWINGS

FIG. 5(a) is a conceptual perspective view illustrating a plurality of reference areas in virtual space. FIG. 5(b) is a conceptual perspective view showing correlations amongst a plurality of target objects from a location point of view with FIG. 5(a) in real space.

FIG. 9 is a conceptual diagram showing one example of how cluster data downloaded from the server at Step 7 shown in FIG. 3 is stored in the terminal data base shown in FIG. 2.

FIG. 15 is a conceptual drawing showing one example of how cluster data downloaded from the server to the user portable terminal shown in FIG. 13 is stored in the terminal data base shown in FIG. 13.

DETAILED DESCRIPTION OF THE PREFERRED EMBODIMENTS

Figure 1:
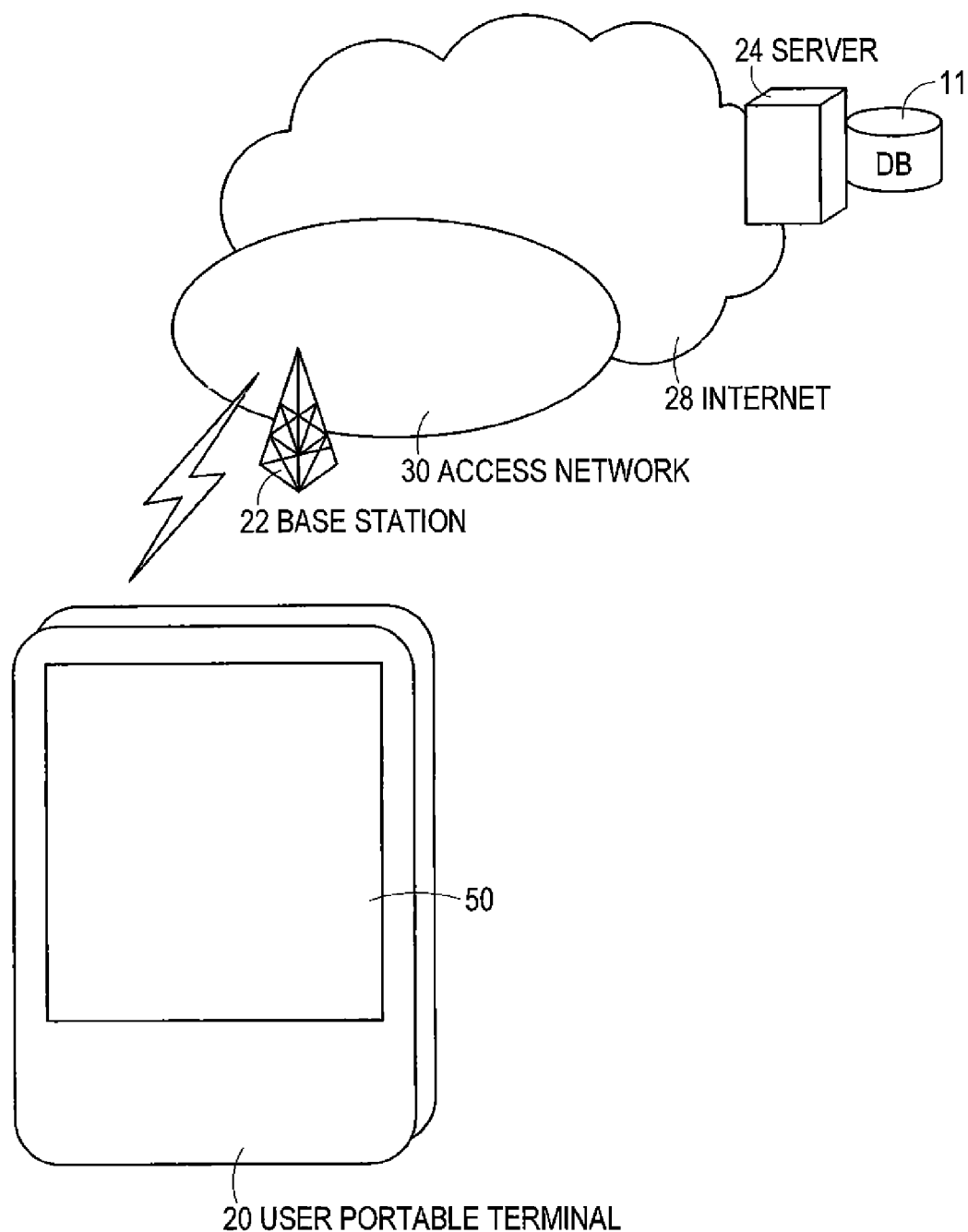
FIG. 1 is a systematic diagram showing a tourist information providing system including a user portable terminal according to an illustrative first embodiment of the present invention.

Hereinafter, a few exemplary and concrete embodiments of the present invention will be described in detail while referring to the drawings.

Description of a First Embodiment of the Invention

FIG. 1 is a systematic diagram showing a tourist information providing system (hereinafter simply referred to as "system") 10 according to an exemplary first embodiment of the present invention.

This system 10 is provided with a plurality of user portable terminals (hereinafter simply referred as "terminals") 20 to be used by a plurality of different users, respectively, a plurality of base stations 22, a server 24 shared by the terminals 20, a data base 26 connected to the server 24, internet 28 as global network and access network 30 as local network. In the present embodiment, each terminal 20 downloads the required information from the server 24 to execute the tourist information retrieval method to be described hereinafter.

Each terminal 20 can be connected to the server 24 allowing communication therewith through the nearest base station 22, the access network 30 which is connected to the relevant base station 22, and the internet 28 which is connected to the access network 30, in this order. For convenience of explanation, in FIG. 1, the one terminal 20 represents a plurality of terminals 20, and the one base station 22 represents a plurality of base stations 22.

Figure 2:
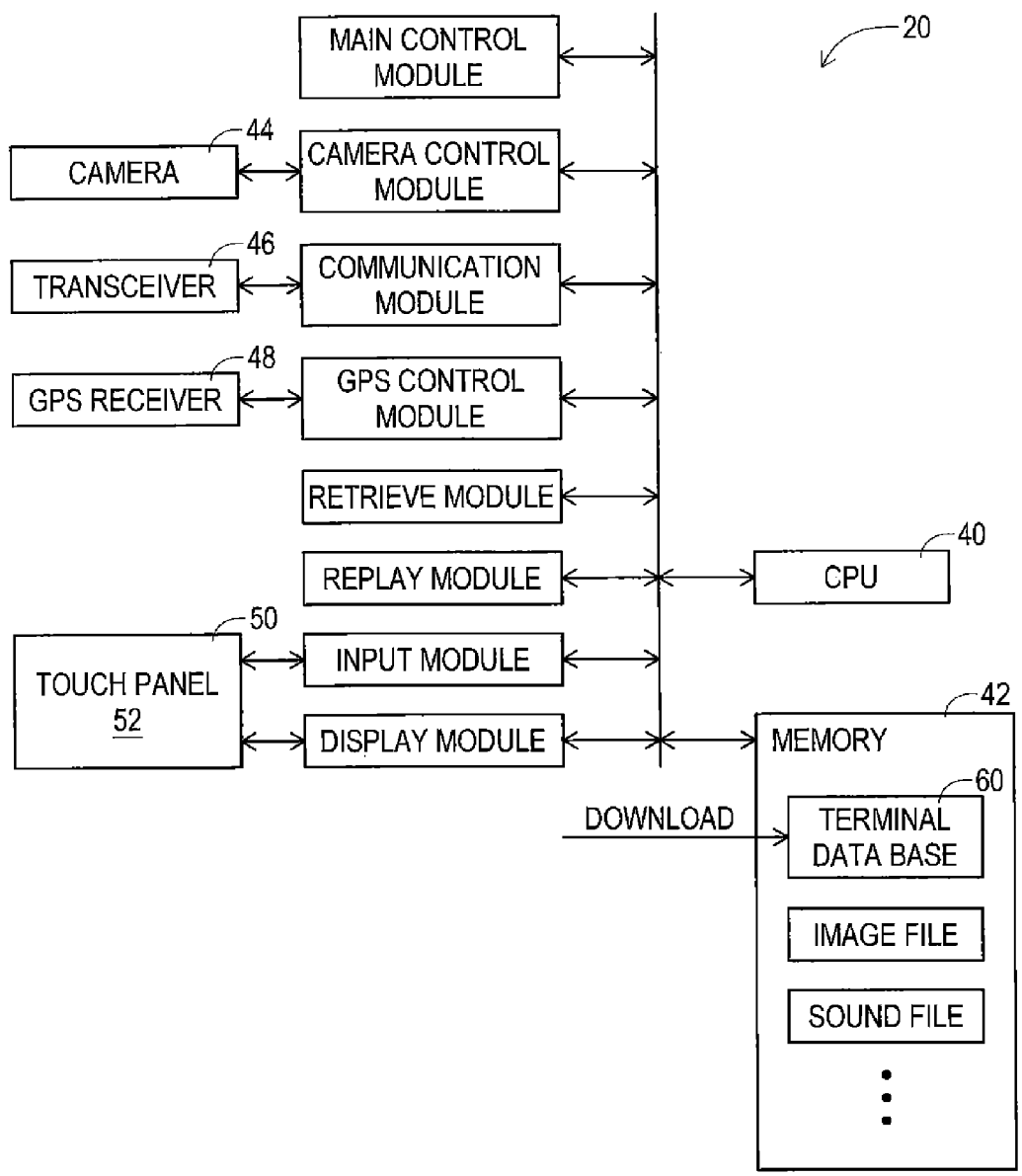
FIG. 2 is a functional block diagram showing the representative user portable terminal illustrated in FIG. 1.

As shown in FIG. 2, the terminal 20 has a CPU (Central Processing Unit) 40 serving as a processor and a memory 42. The terminal 20 may be a portable phone or a smart phone, etc.

The terminal 20 further includes a digital camera 44, a transceiver 46 and a GPS receiver 48. The transceiver 46 carries out wireless communication with the outside and the GPS receiver 48 receives a plurality of radio waves from a plurality of man-made satellites (not shown) to detect one's own current location.

The terminal 20 further has a touch panel 52 with a screen 50 onto which information is visually displayed. The touch panel 52 is adapted for entering commands and information in response to a user's touch operation with respect to the screen 50. The touch panel 52 is therefore an output device as well as an input device.

The memory 42 has a terminal data base 60 for accumulating information (for instance, a plurality of candidate tourist information items, and a plurality of reference areas to be described later) required to retrieve the target tourist information, as well as two storage areas. One storage area is for storing data showing images captured with camera 44 as image files, and the other storage area is for storing data showing sound recorded with a microphone (not shown here, but represents one example of input device) during the image capture operation, as audio files.

Furthermore, memory 42 has another storage area for storing a plurality of modules to be suitably selected and executed by CPU 40. The modules include a main control module for managing the overall terminal 20, a camera control module for controlling the camera 44, a communication module for controlling the transceiver 46, a GPS control module for controlling the GPS receiver 48 and a retrieve module for retrieving tourist information.

These modules further include a replay module, an input module and a display module. The replay module replays the images captured by camera 44 onto the screen 50 and also replays the audio sound recorded during image capturing through speakers, ear-phones or headphones (not shown here, but considered examples of the output device). The input module is adapted for entering commands and information in response to a user's touch operation with respect to the touch panel 52. The display module displays information on the screen 50 of the touch panel 52 as text or images.

Figure 3:
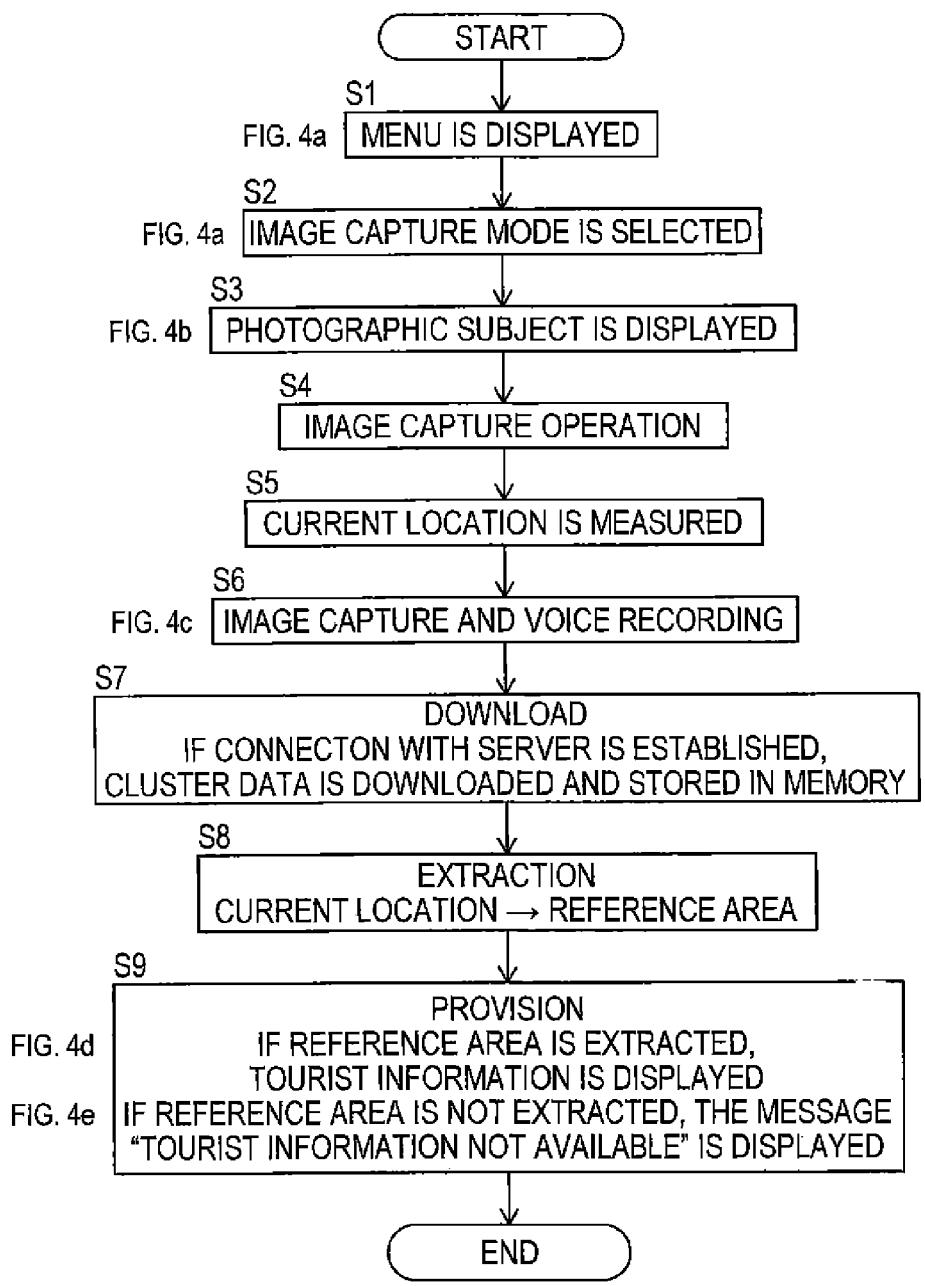
FIG. 3 is a flow chart for illustrating an outline of the overall operation in the user portable terminal as shown in FIG. 1. This is also a conceptual flow chart showing a main section of a main control module as shown in FIG. 2.

FIG. 3 shows a schematic flow chart of the overall operation of the terminal 20. The overall operation of the terminal 20 is realized by the CPU 40 which executes the main control module. Therefore, FIG. 3 shows a conceptual flow chart of the main control module.

Figure 4:
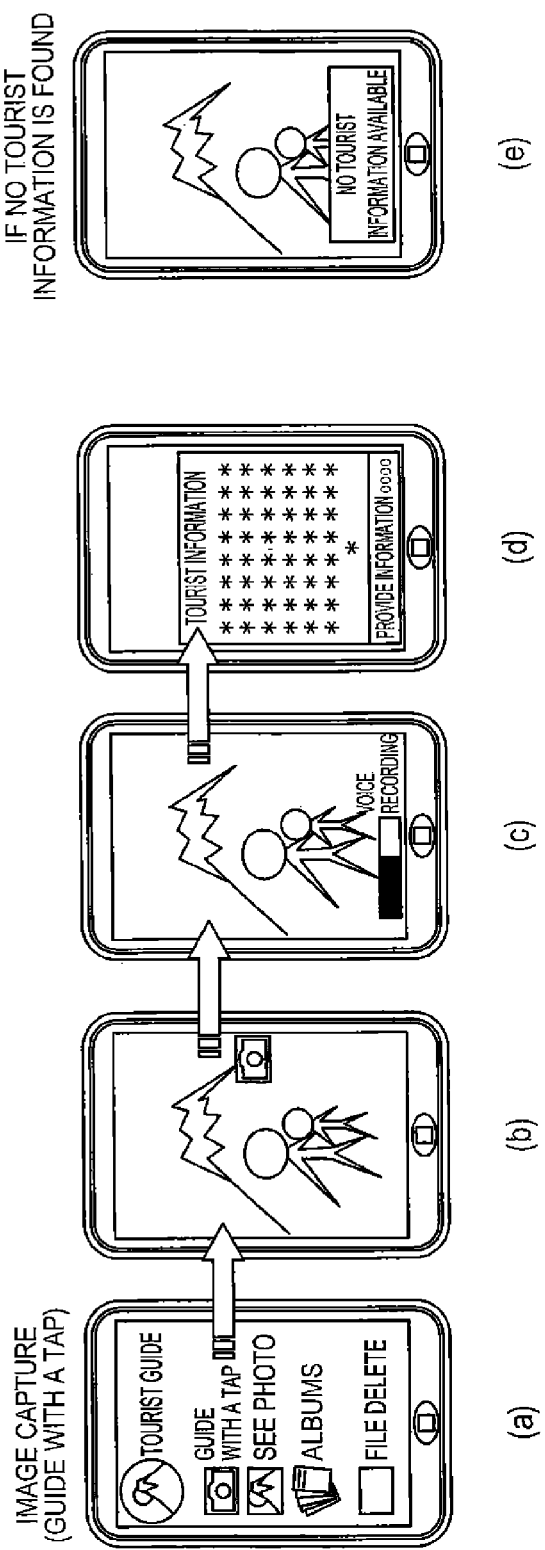
FIG. 4 is a front view of the user portable terminal in FIG. 1 showing one example of how the display contents on its screen change in accordance with the processing contents of the user portable terminal.

Once the terminal 20 is activated, first, at Step S1, the operation menu is displayed on the screen 50 as shown in FIG. 4 (*a*). The operation menu includes a image capture mode and a replay mode to be selected by the user.

To give a brief outline of the image capture mode and replay mode, when the image capture mode is selected by the user, the image of the photographic subject which is displayed on the screen 50 is captured while the sound is being recorded in response to an image capture operation. Also, local tourist information (for instance, visitor information) is displayed on the screen 50 in a timely fashion in conjunction with the image capture operation.

On the other hand, if the replay mode is selected by the user, the images captured by the camera 44 are displayed on the screen 50 and at the same time, tourist information (tourist information which was retrieved and stored at the time of image capturing) is replayed on the screen 50 together with replay of audio data.

Returning to FIG. 3, after Step S1, the image capture mode is selected by the user at Step S2 as shown in FIG. 4(*a*). At Step S3, the current photographic subject is displayed on the screen 50 as shown in FIG. 4(*b*). At this time, an icon representing the shutter button of camera 44 (virtual shutter button) is also displayed on the same screen 50. Step S2 is executed by activation of the camera control module as shown in FIG. 2.

Next, once the image capture operation is carried out by the user (for instance, the user taps the spot on the screen 50 with the icon showing a shutter button), the image capture operation is detected at Step S4.

Thereafter, at Step S5, the current location of the user on the map is measured using the GPS receiver 48. His/her current location is defined by the degree of longitude x and the degree of latitude y on the map. Step S5 is executed by activation of the positioning module shown in FIG. 2. The measured current location is then stored in memory 42 for future use.

Next, as shown in FIG. 4(*c*), at Step S6, an image of the photographic subject is captured to create relevant image data. At the same time the sound at the time of image capturing is recorded to create relevant data representing the recorded sound. Step 6 is executed by activation of the camera control module shown in FIG. 2.

Thereafter, at Step S7, it is determined based on the measured current location, whether the cluster data required for the next retrieval (to be described later) is already stored in the memory 42. Step S7 is executed by activation of the retrieve module as shown in FIG. 2.

If the cluster data required for the next retrieval is not stored in the memory 42, the device will use the transceiver 46 to attempt to connect to the server 24 through the nearest base station 22. Once connection with the server 24 is established, a download request is sent to the server 24 showing that a download of cluster data suitable for the location of the base station 22 employed by terminal 20 is desired.

In response to this download request, the server 24 sends the cluster data required for the next retrieval to the terminal 20 and as a result, the terminal 20 downloads this cluster data from the server 24 and stores it in the terminal data base 60.

Here, the cluster data download is briefly described and thereafter will be described in more detail while referring to FIG. 7 and FIG. 8.

A plurality of reference areas and a plurality of tourist information items are clustered to obtain a plurality of clusters and, during each communication with the server 24 one cluster data showing one cluster from the plurality of clusters is downloaded from the server 24.

Here, the plurality of clusters are allocated with respect to a plurality of partition areas obtained by partitioning the entire area or only a part of area on the map so that one cluster covers one partition area or otherwise, one cluster covers a group of a plurality of partition areas.

At Step S7, from the plurality of partition areas, one cluster data corresponding to the area containing the current location as measured is downloaded from the server 24 and is stored in the memory 42 during each communication with the server 24.

Further, at Step S7, it is determined whether the cluster data required for the next retrieval, in other words, cluster data corresponding to the partition area containing the measured current location is already present in the memory 42. If it is not present, communication with the server 24 is allowed, whereas if it is present, communication with the server 24 is blocked.

The above-described cluster data represents data including a plurality of reference areas (to be later described in detail while referring to the drawings) which are allocated in advance to a plurality of target objects on the map (for instance, amenities, structures, exhibits, townscape, geographical features, etc.), respectively and a plurality of tourist information items (for instance, tourist guides, road guides, store guides in the form of text) which are correlated with each other.

Next, at Step S8, a retrieval operation is carried out with respect to the terminal data base 60 using the current location as measured as a search key. As a result, a reference area containing the measured current location is extracted from the plurality of reference areas stored in that terminal data base 60. Step S8 as well is executed by activating the retrieve module shown in FIG. 2.

Thereafter, at Step S9, as the required cluster data is stored in the terminal data base 60, if the reference area corresponding to the measured current location is extracted, the tourist information from amongst the plurality of tourist information items stored in the terminal data base 60 as corresponding to the extracted reference area is provided to the user as shown in FIG. 4(d). More specifically, the tourist information is displayed on the screen 50 in the form of text. Step S9 as well is executed by activation of the retrieve module as shown in FIG. 2.

On the other hand, as the required cluster data is not stored in the terminal data base 60, if the reference area corresponding to the measured current location is not extracted, a message reading [No tourist information available] is displayed on the screen 50 as shown in FIG. 4(e).

Here, the above-described plurality of reference areas will be described in detail while referring to FIG. 5 and FIG. 6, but first a brief description will be given.

The reference areas are each defined by a location, shape and a size of area on the above-mentioned map. Also, there is a geometrical inclusion/non-inclusion relationship between each of these reference areas and other reference areas and the inclusion/non-inclusion relationship shows the inclusion relationship amongst a plurality of target objects.

More specifically, if the inclusion relationship amongst the target objects is expressed as representing the inclusion relationship between the target objects in real space, while the inclusion/non-inclusion relationship between the reference areas is expressed as representing the inclusion relationship between the target objects in virtual space, then the inclusion relationship between the target objects in real space is expressed as the inclusion relationship between the target objects in virtual space which can be freely set. Thus, the desired target objects are retrieved using the inclusion relationship between the target objects in virtual space and in addition, the target tourist information is retrieved as well.

Figure 5:
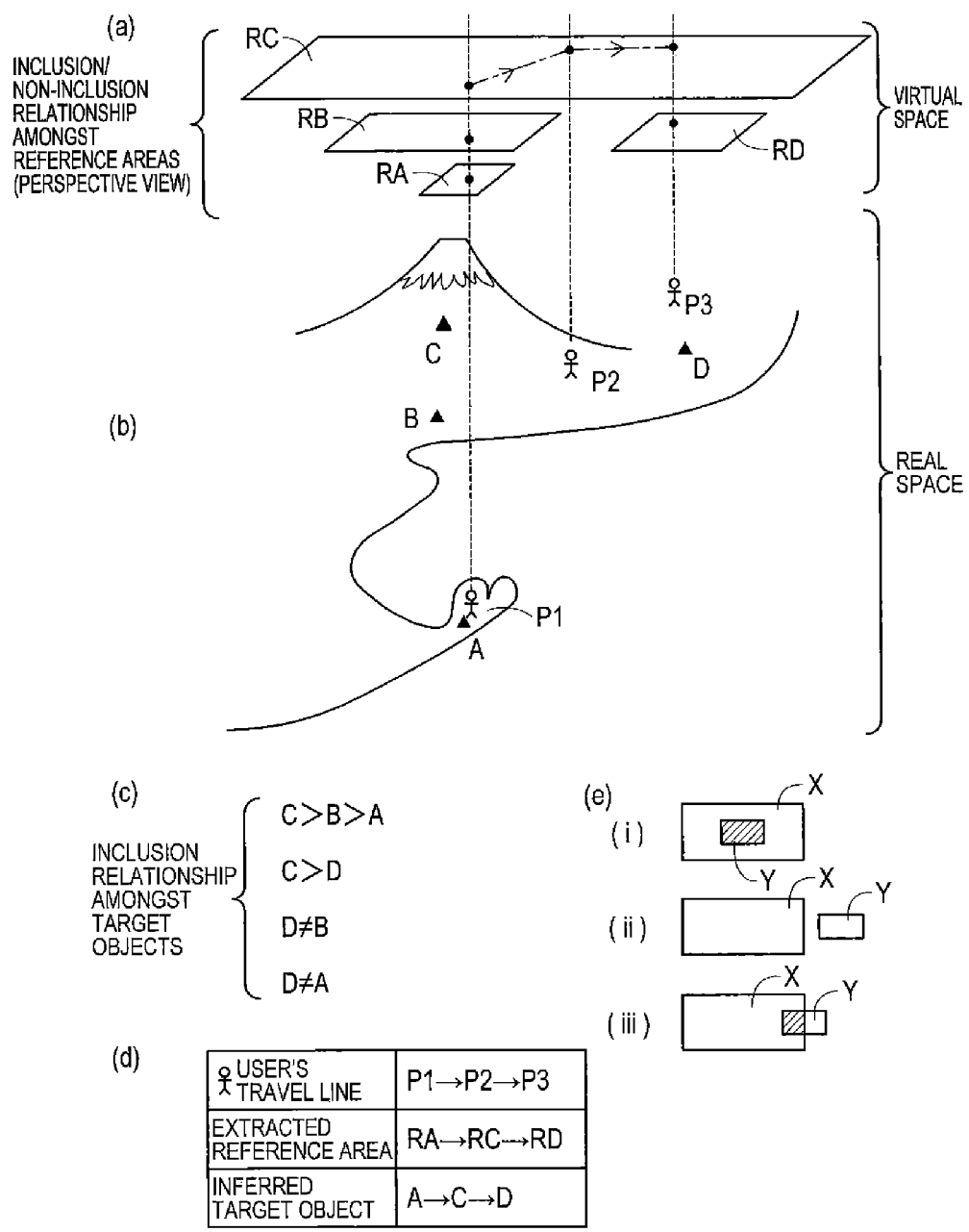
FIGS. 5(a) and 5(b) are both perspective views for giving a conceptual description of correlations between a plurality of reference areas and a plurality of target objects employed in Step S8 as illustrated in FIG. 3. More specifically.
FIG. 5(c) is a diagram showing a formula expressing the inclusion relationship amongst the plurality of target objects shown in FIG. 5(b).
FIG. 5(d) is a diagram illustrating a table showing how the reference area extracted from the plurality of reference areas and the estimated target objects change in time as the user moves around in time, with reference to the examples shown in FIG. 5(a) and FIG. 5(b).
FIG. 5(e) is a plan view for describing three patterns generated by the inclusion/non-inclusion relationship between two reference areas.

In the present embodiment, the above-mentioned inclusion relationship represents a complete inclusion whereby one reference area is geometrically completely contained in another reference area (for instance, this is shown by (i) in FIG. 5 (e)). This means that one of two corresponding target objects belongs to the other area. Also, the above-described non-inclusion relationship represents a complete non-inclusion or complete separation whereby one reference area does not geometrically overlap either partially or entirely with any of the other reference areas (for instance, this is shown by (ii) in FIG. 5(e)). This means that two corresponding target objects do not belong to each other.

However, in the present embodiment, the above-described inclusion/non-inclusion relationship does not include partial inclusion whereby one reference area geometrically overlaps partially with another reference area. (for instance this is shown by (iii) in FIG. 5(e)).

Next, a more concrete description of the plurality of reference areas will be given wile referring to FIG. 5 and FIG. 6.

FIG. 5(a) shows one example of a group of 4 reference areas RA, RB, RC and RD which are present in virtual space and are shown in a perspective view. For convenience of explanation, these reference areas RA, RB, RC and RD are shown as layers, but in reality, there is no height dimension. FIG. 5(b) is a perspective view showing one example of a group of four target objects A, B, C and D as correlated with the four reference areas RA, RB, RC and RD, as they exist in real space.

As shown in the expressions in FIG. 5(c); in the example shown in FIG. 5, target object B belongs to target object C, target object A belongs to target object B and target object D belongs to target object C. However, target object D and target object B do not belong to each other, and similarly, target object. D and target object A do not belong to each other either. For convenience of explanation, in a concrete example, target object A is an establishment such as the [Patent Office], target object B is an area such as [Kasumi-gaseki], target object C is an area such as [Chiyoda-ku] and target object D is an establishment such as [Hibiya Park].

Thus, as shown in FIG. 5(a) which is a perspective view and FIG. 6(a) which is a plan view, respectively, the inclusion relationship amongst target objects A, B, C and D is expressed in terms of the inclusion/non-inclusion relationship between the four reference areas RA, RB, RC and RD.

More specifically, as shown in FIG. 6(b), reference area RC completely encompasses reference area RB, reference area RB completely encompasses reference area RA, and reference area RC completely encompasses reference area RD. However, the relationship between reference area RD and reference area RB is one of complete non-inclusion and similarly, the relationship between reference area RD and reference area RA is one of complete non-inclusion as well.

Each reference area is set to be correlated with a corresponding target object. More specifically, the location, shape as well as size of each reference area can be freely set in advance in accordance with the attributes of a corresponding target object.

Furthermore, more specifically, a larger physical size (for instance, the dimension of a silhouette as obtained when the target object is projected right from above) of the target object (for instance, an establishment, a region) allows for setting of corresponding reference area with a larger surface.

Also, if the physical size of the target object is small, but despite its size, it is a popular site, the corresponding reference area can be set to have a larger size. This is because, potential tourists of the popular target object are likely to be present in an area which is outside the geographical area where the target object is located, and on the other hand, each reference area with a larger surface is more likely to be extracted in each tourist information retrieval step.

Also, with respect to a tourist area which is less popular as it is little known at the present time, if there is a desire to increase their popularity and attract more tourists, the corresponding reference area can be set to have a larger size. This is very advantageous for business entities managing or running a specific tourist area or traders managing tourist enterprises in a specific tourist area to increase their ability to attract tourists.

Therefore, according to the present embodiment, the attributes of a target object are reflected in the location, shape and size of the corresponding reference area, which makes it possible to integrate them as attributes for the respective reference area. Also, when retrieving, from the plurality of reference areas, the reference area suitable for the current location of the user, the attributes of the corresponding target object are considered through the medium of location, shape and size of each reference area.

Here, the attributes of the target objects include objective information as well as subjective information. Objective information includes geographical information, historical facts and the like relating to the target object, whereas subjective information includes opinions and comments made by tourists with respect to the respective target object, as well as advertising of the target object by tourist agents and groups.

As a result, according to the present embodiment, in spite of adopting the location-based retrieval method, it is possible to retrieve the target tourist information while taking into consideration additional attributes of the target object, other than geographical location. This helps improve accuracy in the retrieval of target tourist information.

Additionally, in a concrete example, the plurality of reference areas described above are each tourist distribution areas showing a group of a plurality of locations which could be the current location of any random tourist on the map who is sightseeing at present or plans on going sightseeing, shortly after, a corresponding target object(s). Each tourist distribution area can be set so as to be defined by a shape and size which differ from the actual geographical area where the corresponding target object is located.

Figure 6:
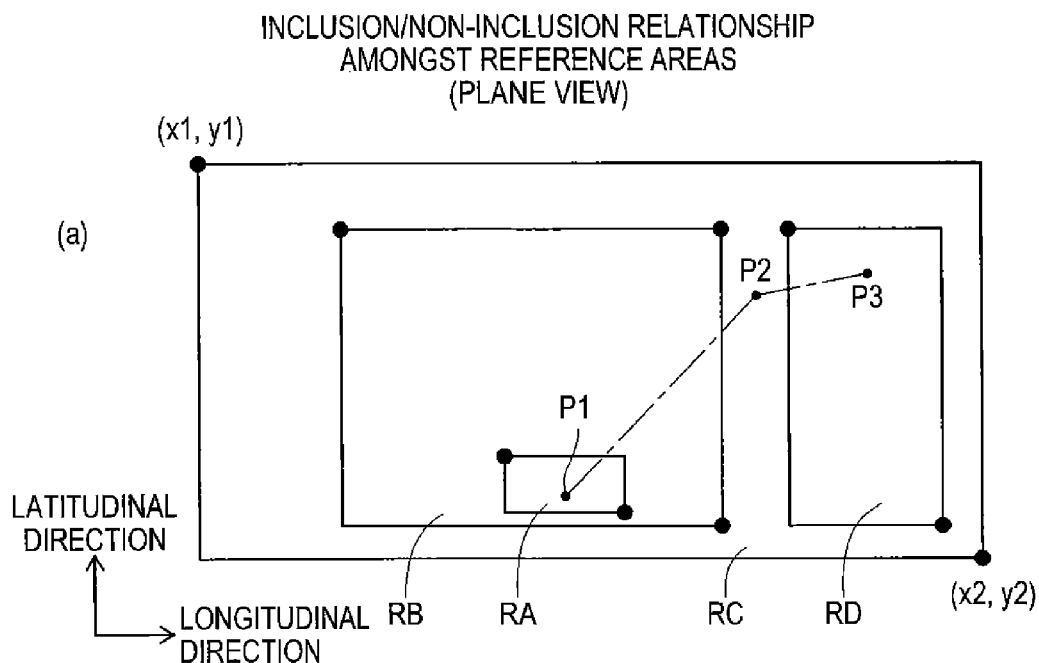
FIG. 6(a) is a plan view showing the plurality of reference areas illustrated in FIG. 5(a).
FIG. 6(b) is a diagram showing a formula for expressing the inclusion/non-inclusion relationship amongst the plurality of reference areas shown in FIG. 6(a).

In the present embodiment, as shown in FIG. 6, for the convenience of calculation, each reference area has a rectangular shape (including a square shape) which is an approximately plane figure and is defined by two sides which are parallel to the longitudinal direction x and two sides which are parallel to the latitudinal direction y on the above-mentioned map. Thus, each reference area is for instance geometrically identified unmistakably by the degree of longitude and the degree of latitude $(x_1, y_1)$ of one position of a pair of diagonal positions in a rectangle, and the degree of longitude and the degree of latitude $(x_2, y_2)$ of the other position.

Alternatively, the shape of each of the reference areas can also be polygonal, with five or more sides. A polygon with a higher number of sides will make it increasingly easier for the designer of system 10 to fully reflect the attributes of the target object in the shape and size of the corresponding reference area. In other words, it will make it easier to increase the amount of information held by the corresponding reference area. Nonetheless, the amount of information held by each of the reference areas and the computation time required at the time of retrieval are in a trade off relationship.

Next, the above-described cluster data will be described in more detail while referring to FIG. 7 and FIG. 8.

Cluster data is unit data which is downloaded, during each one communication with the server 24, from the server 24 to the terminal 20. The amount of cluster data is determined in consideration of transmission speed, as well as processing speed and storage capacity of terminal 20, for instance, so that the time required for download passes smoothly without causing irritation to the user.

On the other hand, the above described plurality of reference areas and plurality of tourist information items which are correlated with each other are allocated to the plurality of partition areas on the above-described map (for instance, map indicating one region of one country, map indicating the full territory of one country, map indicating a plurality of neighboring countries, world map, etc.).

Figure 7:
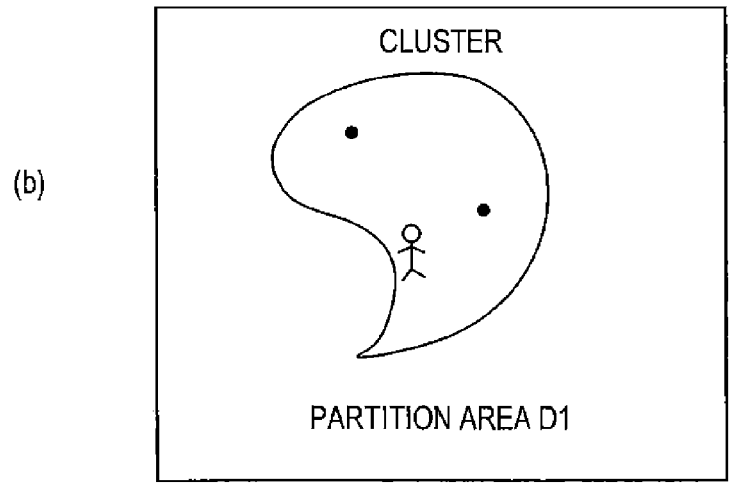
FIG. 7(a) is a conceptual drawing showing a first example of a configuration of cluster data as downloaded from the server at Step S7 as shown in FIG. 3.
FIG. 7(b) is a plan view showing one example of a conceptual location on the map for partition area D1 as illustrated in FIG. 7(a).
Figure 8:
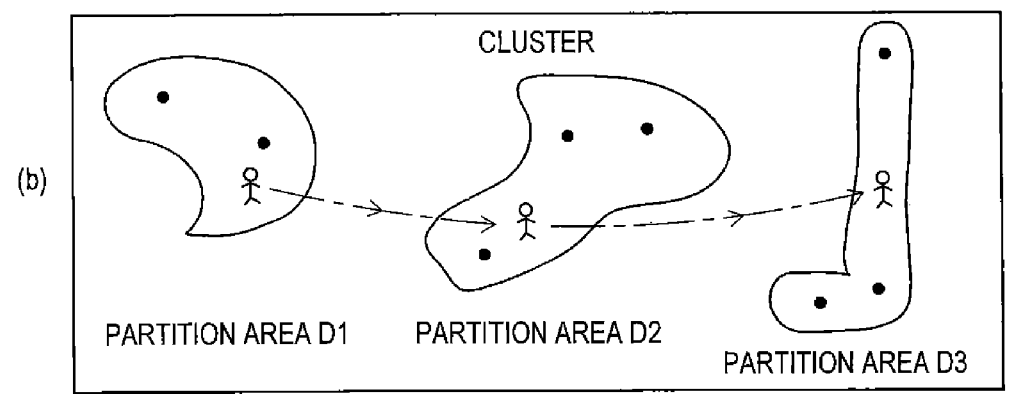
FIG. 8(a) is a conceptual drawing showing a second example of a configuration of cluster data as downloaded from the server at Step S7 as shown in FIG. 3.
FIG. 8(b) is a plan view showing one example of a conceptual location on the map for a group including partition areas D1, D2 and D3 as shown in FIG. 8(a).

As shown in FIG. 7 and FIG. 8, data showing one reference area and data showing one item of tourist information (this can include one or more types of messages) and which are correlated with each other constitute one element data set. A plurality of element data sets are allocated to one partition area and the plurality of element data sets constitute one block. Specifically, one partition area corresponds to one block.

Thus, a plurality of blocks are allocated to the above-mentioned overall map and a portion of these blocks are clustered together to form one cluster. The data showing one cluster is the above-described cluster data and includes data indicating a plurality of reference areas belonging to that cluster and data indicating a plurality of tourist information items correlated with the respective reference areas.

In a first clustering example as shown in FIG. 7, one block No. 1 constitutes one cluster. Accordingly, in the first example, one partition area D1 corresponds to one cluster and one block No. 1 corresponds to the partition area D1.

On the other hand, in a second clustering example as shown in FIG. 8, three blocks, block No. 1, block No. 2 and block No. 3 constitute one cluster. Thus, in the second example, three partition areas D1, D2 and D3 correspond to one cluster and in turn, three blocks, block No. 1, block No. 2 and block No. 3 correspond to partition areas D1, D2 and D3, respectively.

In the second example, the three partition areas D1, D2 and D3 which belong to one cluster may be located adjacent to each other geographically speaking, but may also be scattered away from each other geographically speaking, as shown in FIG. 8(b).

When employing clustering as shown in FIG. 8, if, for instance, users go sightseeing according to the schedule of a sightseeing tour (for instance, sightseeing tours which require large scale transfers using transportation such as train, bus, plane, ship, etc.) which is planned in advance and are scheduled to tour a plurality of target objects which are scattered geographically speaking (for instance, across more than one country) in a certain order, the partition areas corresponding to these target objects can be gathered into one cluster.

When employing clustering, one cluster can cover one sightseeing tour. On the other hand, once the data base 26 receives a download request from the terminal 20, as long as the user's current location is located within any partition area covered by the sightseeing tour, the server 24 can transmit to the terminal 20, in a lump, cluster data indicating a cluster corresponding to that sightseeing tour, more specifically, data showing a plurality of tourist information items as well as a plurality of reference areas corresponding to a plurality of partition areas covered by the sightseeing tour.

Thus, if at least one download is possible from the server 24 during the sightseeing tour, the terminal 20 can download all the tourist information required for the sightseeing tour.

Thus, as long as connection with the server 24 can be established at any one location from the plurality of partition areas covered by the sightseeing tour, even if the download from the server 24 is carried out in any of the partition areas, terminal 20 can retrieve, in any partition area, tourist information suitable for that partition area. As a result, the user can acquire tourist information suitable for the current location at any time during the tour irrespective of the current location, more specifically, irrespective of whether connection with the server 24 is established or not.

FIG. 9 shows a conceptual configuration of cluster data which is downloaded from the server 24 into the terminal 20 and stored in the terminal data base 60.

The terminal data base 60 stores data indicating a plurality of reference areas and data indicating a plurality of tourist information items which are correlated to each other. Data indicating the respective reference areas includes geographical coordinates data $(x_1, y_1)$ showing a point which is located in a first diagonal position and geographical coordinates data $(x_2, y_2)$ showing a point in a second diagonal position, among the four points defining a quadrangular reference area.

Figure 10:
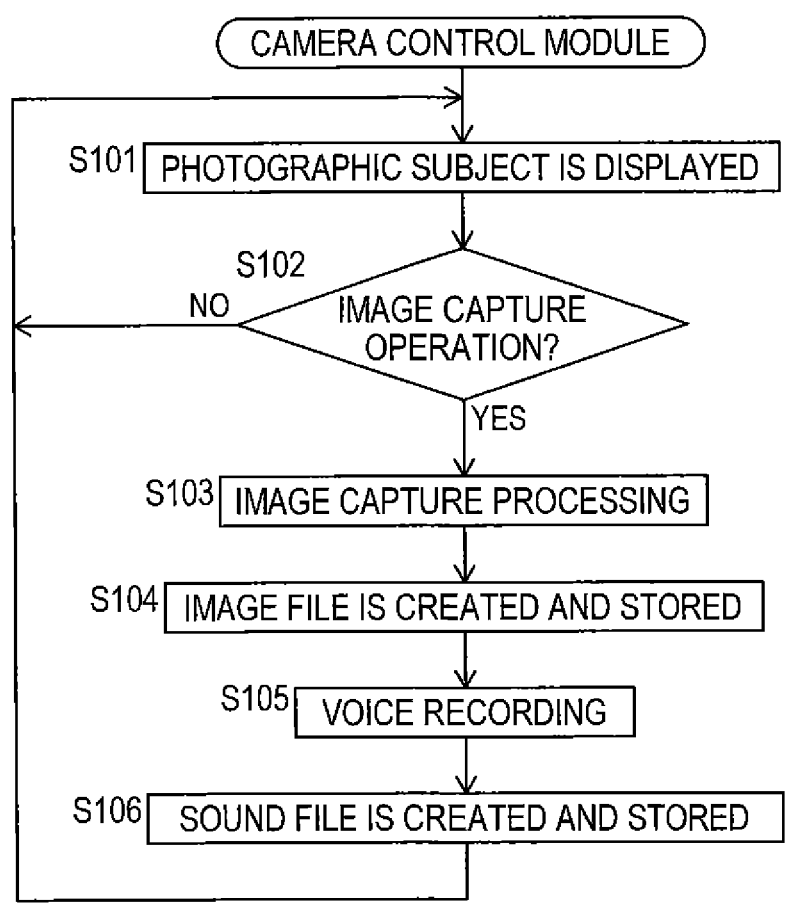
FIG. 10 is a conceptual flow chart showing a camera control module as illustrated in FIG. 2.

FIG. 10 shows a conceptual flow chart of the above-described camera control module.

Once the camera control module is executed by the CPU 40, first, at Step S101, a target subject located in front of a camera 44 lens (not shown) is displayed on the screen 50 of terminal 20 as photographic subject. Next, at Step S102, the user's image capturing operation is awaited.

Once the image capturing operation is carried out, a predetermined image capture processing operation is carried out at Step 103. Next, an image file is created at Step S104 showing the image of the photographic subject as captured by the camera 44. The image file thus created is time tagged and is then stored at a predetermined location in the memory 42.

Thereafter, at Step S105, recording of surrounding sounds will start at a predetermined interval immediately after image capturing using the microphone. Next, an audio file indicating the sounds recorded by the microphone is created at Step S106. The audio file thus created is correlated with the image capture time and is then stored at a predetermined location in the memory 42.

As a result, the image file and the audio file created in response to the same image capture operation are correlated with each other through the same image capture time. Thus, in replay mode, the captured image and recorded voice are replayed in sync with each other on the image output device, specifically screen 50 and the audio output device, specifically the speakers, etc., respectively.

Thereafter, returning to Step S101, another image capturing operation by the user is next awaited at Step S102.

Figure 11:
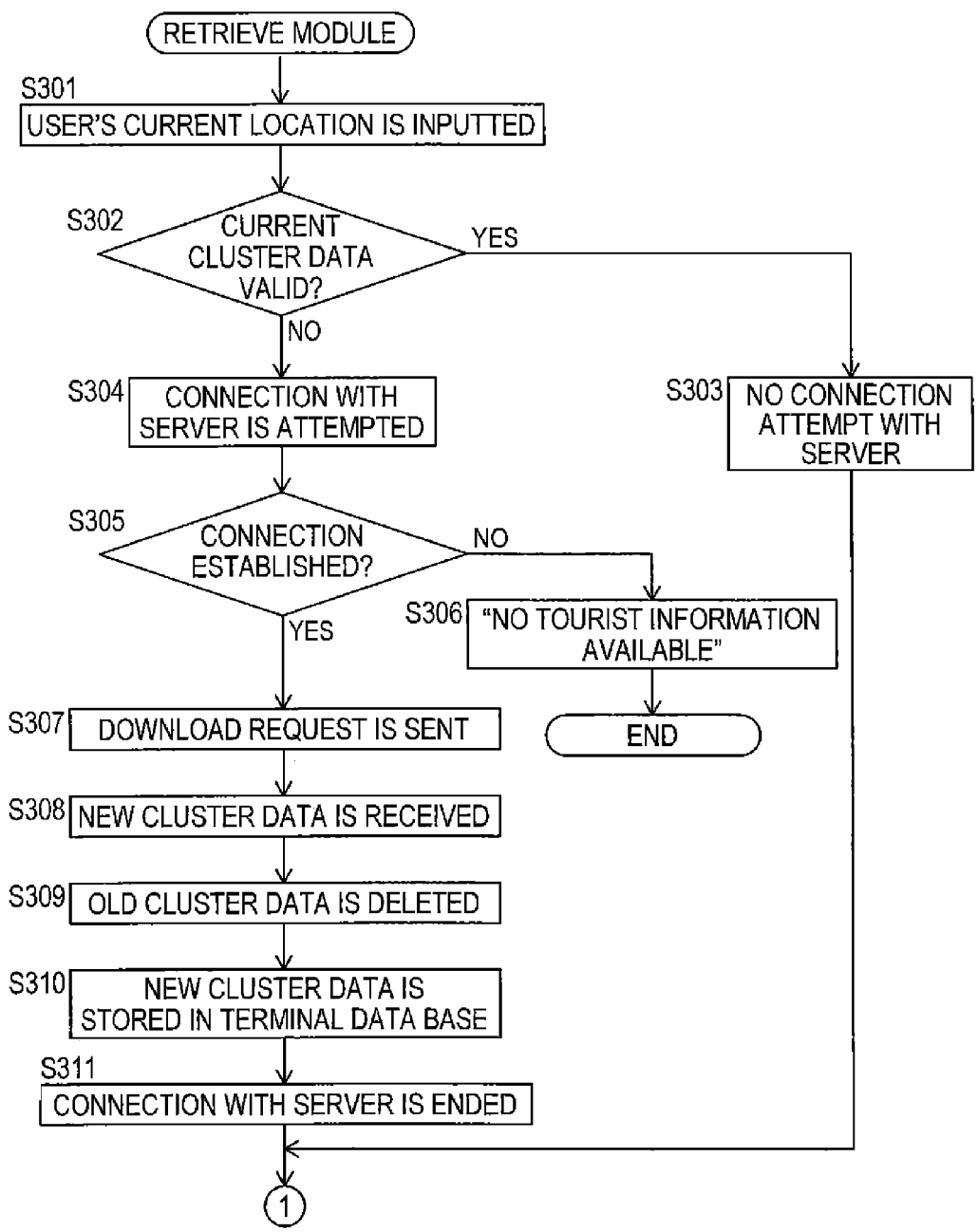
FIG. 11 is a conceptual flow chart showing a retrieve module as illustrated in FIG. 2.
Figure 12:
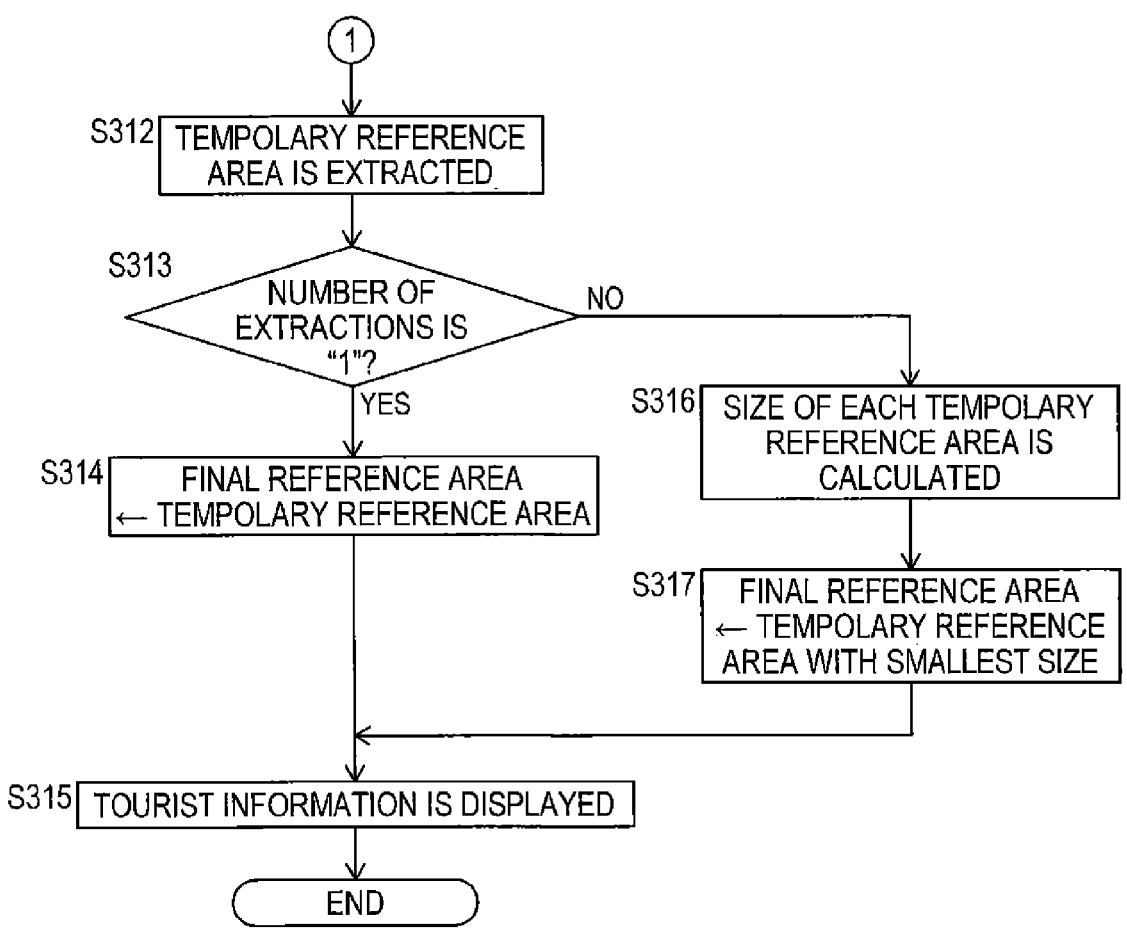
FIG. 12 is a conceptual flow chart showing a continuation of the retrieve module as illustrated in FIG. 11.

FIG. 11 and FIG. 12 show conceptual flow charts of the above-described retrieve module. This retrieve module is executed once the user's image capturing operation is detected at Step S4 as shown in FIG. 3, in order to carry out the operations at Steps S8 and S9.

Once the retrieve module is executed by the CPU 40, first, the user's current location as detected by the GPS receiver 48 (latest measurement result) is inputted from the memory 42 at Step S301.

Next, at Step S302, it is determined whether or not the cluster data currently stored in the terminal data base 60, specifically the current cluster data is valid for the retrieval operation which is to be carried out next. More specifically, it is determined whether or not the user's current location is within the partition area corresponding to the current cluster data.

More specifically, in the present embodiment, in order to make calculation by the CPU 40 easier, it is determined whether or not the user's current location is found within any of the plurality of reference areas included in the current cluster data.

For instance, a determination is carried out with respect to at least one of the plurality of reference areas to confirm whether or not the longitude ($x_{user}$) of the current location is found within a longitudinal direction range (from $x_1$ to $x_2$) of a quadrangle in that reference area and the latitude ($y_{user}$) of the current location is found within a latitudinal direction range (from $y_1$ to $y_2$) of a quadrangle in the same reference area.

Next, assuming the current cluster data is valid, the result of the determination at Step S302 is positive (YES), and at the next. Step S303, no attempt to connect with the server 24 is made. Further, the flow will continue with Step S312 described in FIG. 12.

On the other hand, next, assuming the current cluster data is not valid, the result of the determination at Step 302 is negative (NO) and at the next Step S304, an attempt to connect with the server 24 is made.

Then, at Step S305, it is determined whether or not connection with the server 24 has been established.

Further, assuming connection with the server 24 failed to be established, the result of the determination at Step S305 is negative (NO), and then, at Step S306 a message is displayed on the screen 50 reading "No tourist information available" as shown in FIG. 4(e). Thus, as no cluster data required for retrieval is found for the current location, it is impossible to retrieve the target tourist information. Accordingly, the current execution operation of the retrieve module is ended.

On the other hand, assuming that connection with the server 24 is successfully established, the result of the determination operation at Step S305 is positive (YES), and thereafter, at Step S307, the download request as described earlier is sent to the server 24.

Next, new cluster data is downloaded at Step S308 from the server 24 in response to the download request. The new cluster data is cluster data covering a partition area where the user's current location is found. Then, at Step S309, the old cluster data is deleted from the terminal data base 60.

Further, at Step S310, the newly downloaded cluster data is stored in the terminal data base 60. As a result, the old cluster data is substituted with the new cluster data in the terminal data base 60.

Next, connection with the server 24 is ended at Step S311.

Then, at Step S312, the reference area where the user's current location is found is extracted as a temporary reference area from the plurality of reference areas indicated by the current cluster data stored in the terminal data base 60. Similar with Step S302, this extraction is also carried out by comparing the geographical coordinates values of each respective reference area with the geographical coordinates values of the user's current location.

Next, at Step S313, it is determined whether or not the number of extractions representing the number of reference areas as extracted at the preceding Step S312 is [1]. Assuming the number of extractions at this time is [1], the result of the determination at Step S313 is positive (YES) and then, at Step S314 it is determined that the current one temporary reference area corresponds to one final reference area.

Thereafter, at Step S315, tourist information correlated to this final reference area is extracted as the most suitable tourist information from amongst the plurality of tourist information items defined by the current cluster data as stored in the terminal data base 60. The most suitable tourist information as extracted is then displayed on the screen 50 of terminal 20. This ends the current execution operation of this retrieve module.

On the other hand, assuming the number of extracted reference areas is more than [1], the result of the determination operation at Step S313 is negative (NO), and therefore the flow will shift to Step S316.

The size of each of the plurality of temporary reference areas thus extracted is calculated at Step S316. More specifically, the size of each temporary reference area is calculated while focusing on the fact that each temporary reference area is rectangular or square and the respective geographical coordinates values at two points in a diagonal position are already known, and then using these geographical coordinates values.

Thereafter, at Step S317, the temporary reference area with the smallest calculated size is extracted as one final reference area from the plurality of temporary reference areas thus extracted. Then, the operation flow shifts to Step S315 where the tourist information correlated with the final reference area thus extracted is displayed on screen 50. This ends the current execution operation of this retrieve module.

Here, the execution contents of the retrieve module as described in detail while referring to FIG. 11 and FIG. 12 will be discussed in more detail.

For convenience of description, in the one example shown in FIG. 5, it is assumed that the tourist, as the user, moves in one region as shown in FIG. 5, from spot P1, to spot P2 and finally spot P3, in this order.

In the event the retrieve module is executed as shown in FIG. 11 and FIG. 12, when the tourist carries out the image capture operation at spot P1, reference area RA is extracted and the relevant tourist information correlated with this reference area RA is displayed on the screen 50 of the terminal 20. At this time it is estimated that the target object A is the target object onto which the tourist is focusing at that time, and finally, the tourist information displayed on the screen 50 of the terminal 20 is the information showing the attributes of the estimated target object A.

Next, when the tourist carries out the image capture operation at spot P2, reference area RC is extracted and the tourist information correlated with the reference area RC, specifically information showing the attributes of the estimated target object C is displayed on the screen 50 of the terminal 20.

Then, when the tourist carries out the image capture operation at spot P3, reference area RD is extracted and the tourist information correlated with the reference area RD, specifically information showing the attributes of the estimated target object D is displayed on the screen 50 of the terminal 20.

Thus, in the present embodiment, the tourist information which appears on the screen 50 of the terminal 20 changes momentarily each time an image capture operation is carried out as the tourist moves, in accordance with the current location of the tourist.

Furthermore, in the present embodiment, the tourist information correlated with the respective reference areas indicates the attributes of the target object correlated with that respective reference area.

More specifically, for instance, in the example shown in FIG. 5, if the target object C is a landform such as [Mount Fuji], tourist information correlated with that target object C is created so as to include information indicating, for instance, the geographical features, topographical features, scientific features, historic features, road guide, valuations, etc. for [Mount Fuji].

However, in contrast with this, as will be described later by way of example in a second embodiment, the tourist information displayed on the display 50 of the terminal 20 may also be created so as to show the attributes of other target objects than the target object corresponding to the corresponding reference area.

More specifically, as will be described in more detail later, for instance, in the event the user stands at the present azimuth angle within the reference area corresponding to the tourist information displayed on the screen 50 of the terminal 20, settings may be changed so as to display tourist information with respect to target objects which the user can visually recognize in front of him on the screen 50 of the terminal 20.

More specifically, for instance, as shown in the example in FIG. 5, the target object A is the "Pinery of Miho" in Shizuoka City, Shizuoka Prefecture, which is a picturesque scenery commanding a view of Mount Fuji, and the target object C is a geographical feature such as "Mount Fuji". In this case, in an embodiment for carrying out the present invention, when the terminal 20 detects that the user stands within the reference area corresponding to target object A while pointing to almost true north, which triggers the user's image capture operation, tourist information with respect to target object C, instead of target object A is displayed on the screen 50 of the terminal 20.

Additionally, in the present embodiment, the CPU 40 in the terminal 20 and, in the memory 42, the unit adapted for storing the main control module, communication module, GPS control module and retrieve module to be executed by CPU 40 constitute together a controller.

In this controller, the unit adapted to carry out Steps S4 and S5 as shown in FIG. 3 acts as a measurement unit, the unit adapted to carry out Step S8 as shown in the same drawing acts as an extraction unit, and the unit adapted to carry out step S9 as shown in the same drawing acts as a providing unit.

Also, in the controller, the unit adapted to carry out Steps S301 through S303 as shown in FIG. 11 acts as a communication permission/prohibition unit, the unit adapted to carry out Steps S304, S305, S307 and S308 as shown in the same drawing acts as a download unit, and the unit adapted to carry out steps S309 and S310 as shown in the same drawing acts as an overwriting unit.

Description of a Second Embodiment of the Invention

Next, a tourist information providing system including a user portable terminal 100 according to a second embodiment of the present invention will be described while referring to FIG. 13 through FIG. 18. In the present embodiment, some elements are the same as those in the user portable terminal 20 and tourist information providing system 10 according to the first embodiment and therefore they will be used with the same symbols or denomination and redundant description thereof will be omitted. A detailed description will be given only for elements which differ from those referred to in the first embodiment.

Figure 13:
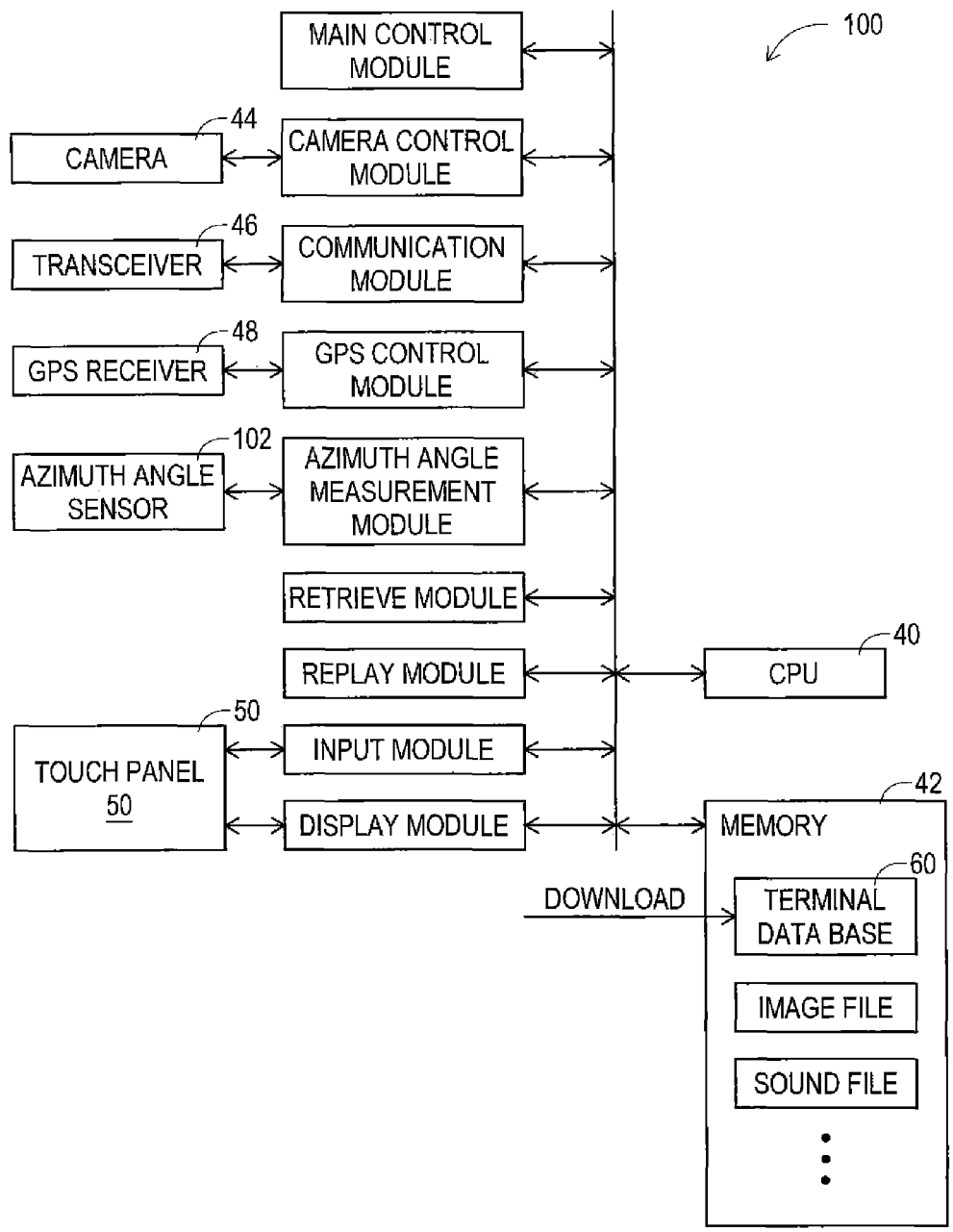
FIG. 13 is a functional block diagram showing a user portable terminal according to an illustrative second embodiment of the present invention.

FIG. 13 is a conceptual functional block diagram of a user portable terminal 100 (hereinafter simply referred to as "terminal 100") according to the present embodiment. This terminal 100 has common elements with the terminal 20 shown in FIG. 2 of the first embodiment, except for the fact that in addition, it also has an azimuth angle sensor 102 and an azimuth angle measurement module.

The azimuth angle sensor 102 is built in the terminal 100 so as to be immovable with respect to terminal 100 and is constituted as a magnetic compass or as a gyro compass, for instance. The azimuth angle is defined for instance as an angle in the horizontal direction with respect to a reference line which is fixed on the globe.

The above-mentioned azimuth angle measurement module is activated in response to a user's image capture operation and is adapted to measure the azimuth angle of the terminal 100 as the current azimuth angle, immediately following the user's image capture operation based on the output signal from the azimuth angle sensor 102.

In the cluster data in the present embodiment, of the plurality of tourist information items, the information items correlated with the respective reference areas include a plurality of azimuth angle specific tourist information items which are thus correlated with a plurality of azimuth angles, respectively.

Figure 14:
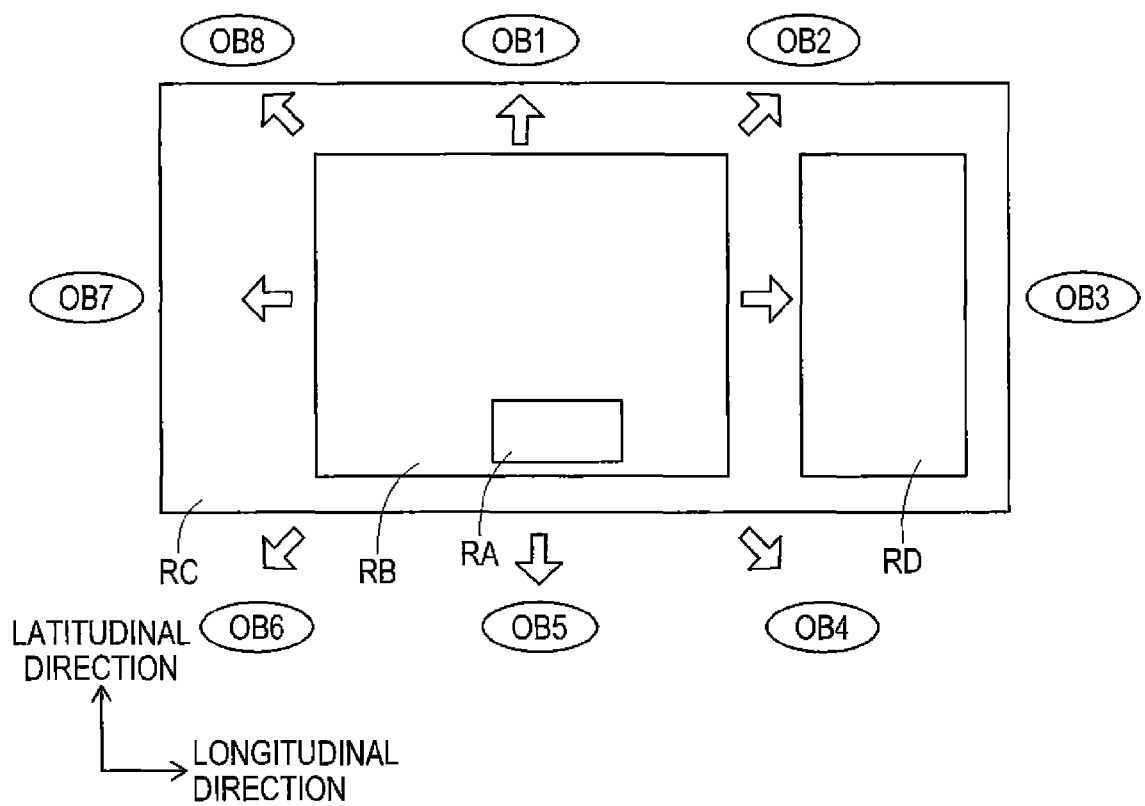
FIG. 14 is a plan view showing how target objects are correlated, for each azimuth angle, with a plurality of reference areas stored in the terminal data base as shown in FIG. 13.

FIG. 14 is a plan view showing a plurality of reference areas, as stored in the terminal data base 60 shown in FIG. 13, which are correlated with respective target objects OB for each azimuth angle. Reference areas RA, RB, RC and RD in the example shown in FIG. 14 are the same as reference areas RA, RB, RC and RD shown in FIG. 6 of the first embodiment.

In the example shown in FIG. 14, the plane right above the sheet indicates true north which is the reference direction, and target objects OB1, OB2, OB3, OB4, OB5, OB6, OB7 and OB8 which are each spaced apart from the reference direction by 45 degrees in a clockwise direction are allocated to one reference area RB.

These target objects OB1, OB2, OB3, OB4, OB5, OB6, OB7 and OB8 can be selected so that none of them coincides with the target object B corresponding to reference area RB, or so that some of them coincide with the target object B while the rest of them do not coincide with the target object B.

FIG. 15 is a conceptual diagram showing one example of a configuration for the cluster data downloaded from the server 24 to the terminal 100. This example is common with the example shown in FIG. 7(a) of the first embodiment, with the exception of the tourist information contents.

In the example shown in FIG. 15, each of a plurality of azimuth angle specific tourist information items is correlated with each respective reference area, and each azimuth angle specific tourist information is correlated with each respective azimuth angle.

Figure 16:
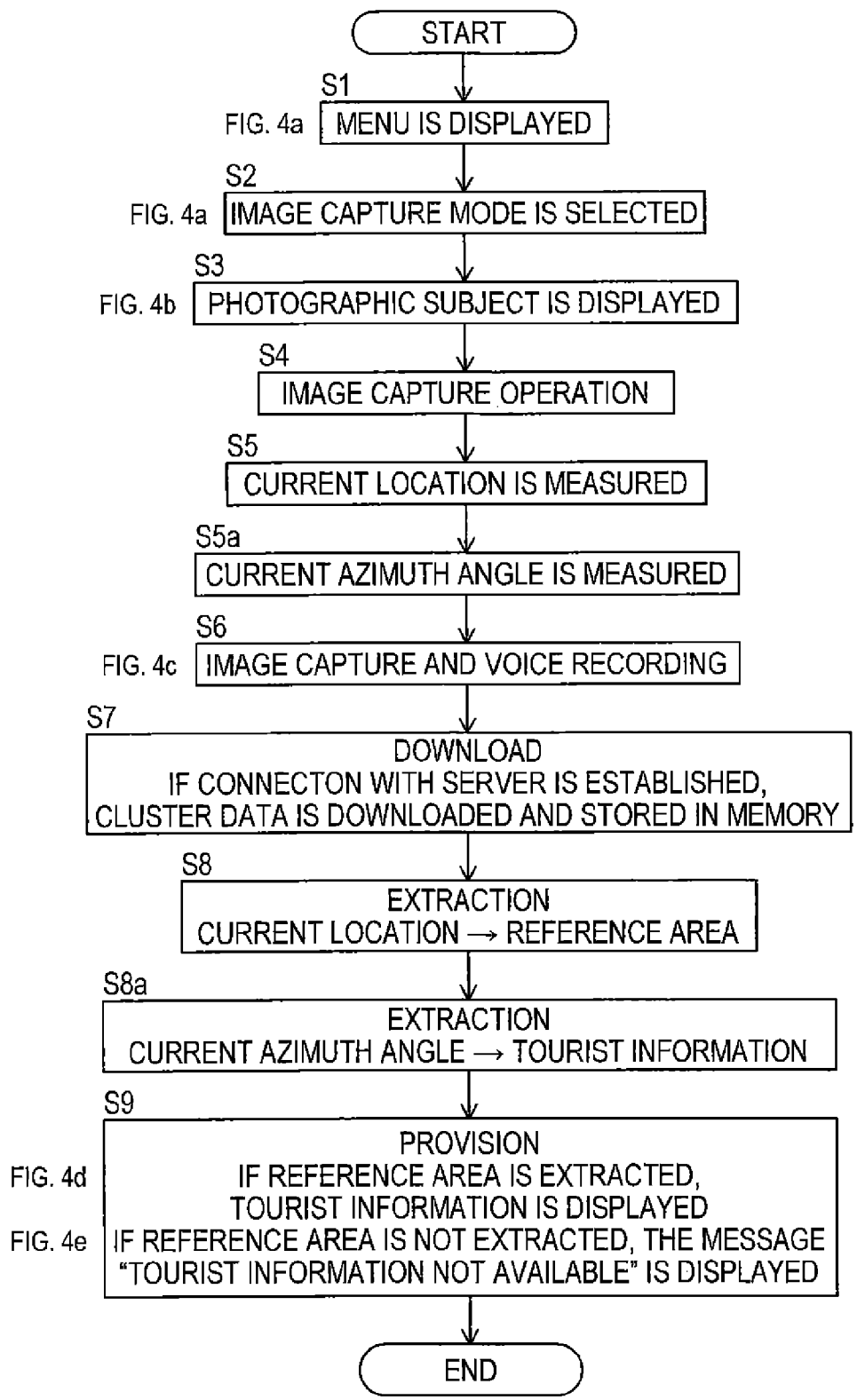
FIG. 16 is a flow chart for describing an outline of the overall operation of the user portable terminal as shown in FIG. 13, and is also a conceptual flow chart showing the main portion of a main control module shown in FIG. 13.

FIG. 16 is a conceptual flow chart showing an outline of the overall operation of the terminal 100.

The flow chart illustrated in FIG. 16 is the same as the flow chart illustrated in FIG. 3 of the first embodiment, except for the fact that in addition it also has Steps S5a and S8a. Thus, these additional steps will be described in detail, while description of overlapping steps will be omitted.

At Step S5a, after step S5 is carried out to measure the current location of the user, the azimuth angle measurement module is executed using the azimuth angle sensor 102 to measure the current azimuth angle of the user. The current azimuth angle thus measured is then stored in the memory 42 for future use.

At Step S8a, after step S8 is carried out to extract one reference area corresponding to the user's current location, one item of azimuth angle specific tourist information is extracted from the plurality of azimuth angle specific tourist information items as correlated with the extracted reference area so that the difference between the azimuth angle allocated to this one item of azimuth angle specific tourist information and the current azimuth angle as measured is less than or equal to a predetermined value.

As a result, the tourist information, from amongst the plurality of azimuth angle specific tourist information items as correlated to the extracted reference area, to which an azimuth angle which is closest to the current azimuth angle as measured is allocated is extracted as the most suitable tourist information.

Figure 17:
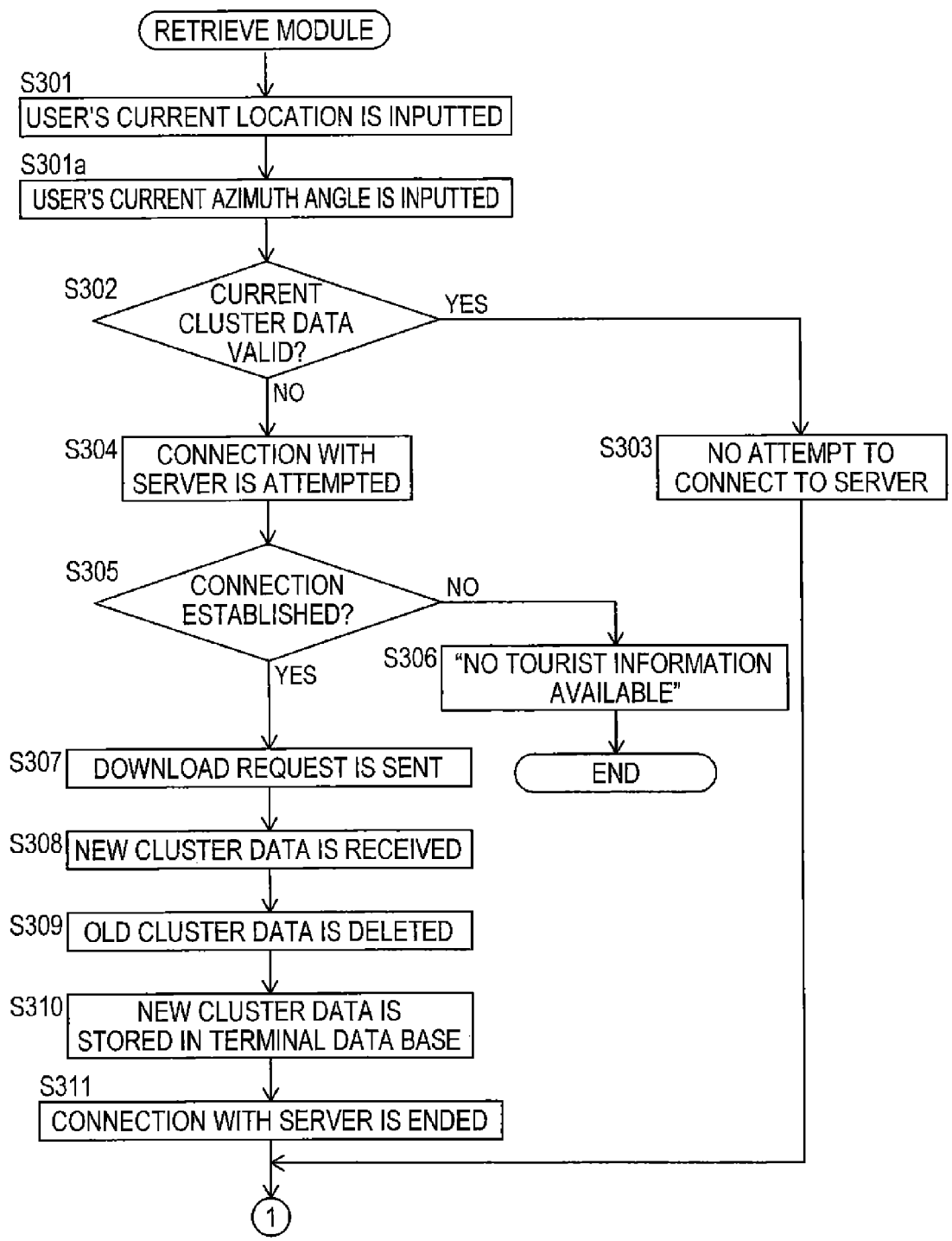
FIG. 17 is a conceptual flow chart showing a retrieve module as illustrated in FIG. 13.
Figure 18:
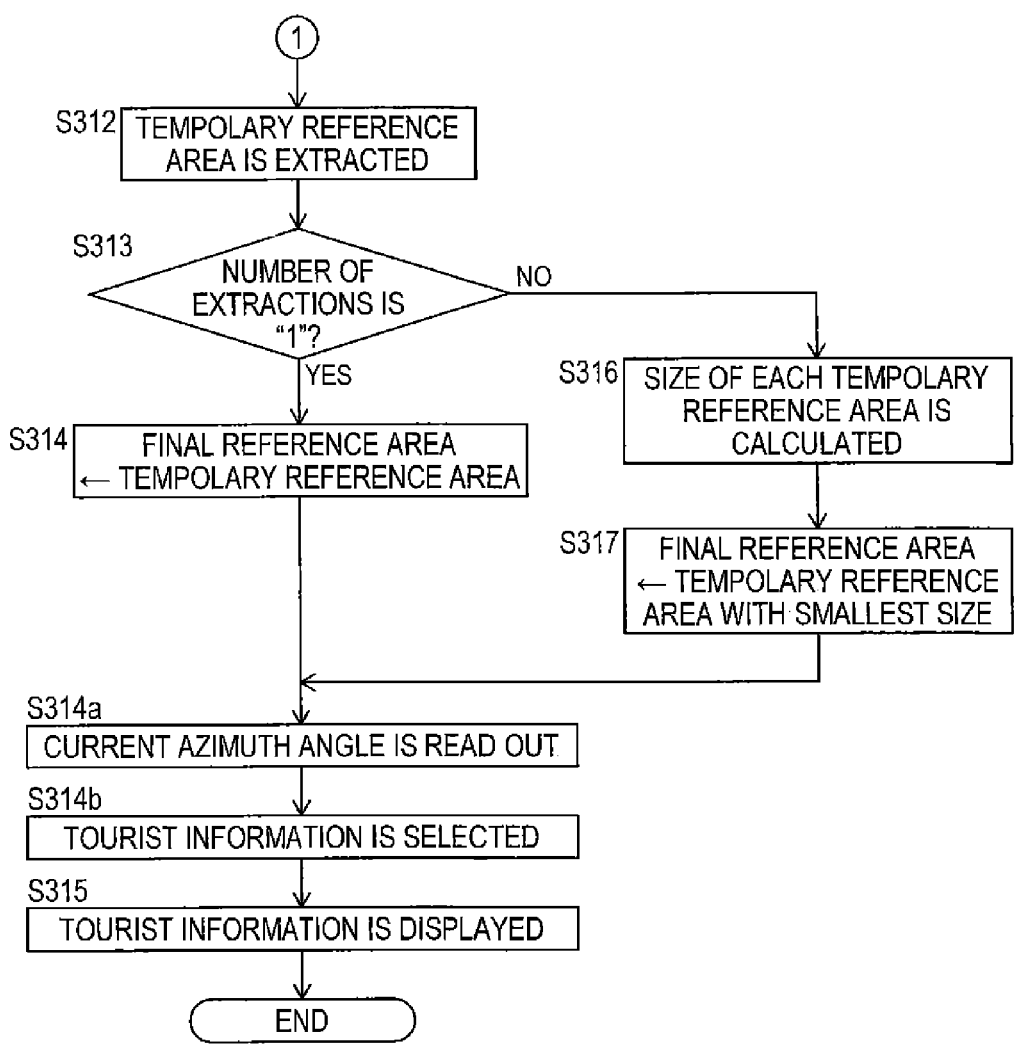
FIG. 18 is a conceptual flow chart showing a continuation of the retrieve module as illustrated in FIG. 17.

FIG. 17 and FIG. 18 are conceptual flow charts, the former showing one portion of the retrieve module shown in FIG. 13, and the latter showing the remaining portion of the retrieve module, respectively.

The portion of the retrieve module as shown in FIG. 17 is common with the flow chart illustrated in FIG. 11 of the first embodiment, except for the fact that in addition it also has Step S301a, and is also common with the flow chart illustrated in FIG. 12 of the first embodiment, except for the fact that it also has steps S314a and S314b. Thus, these additional steps only will be described in detail, while description of overlapping steps will be omitted.

At Step S301a, after Step S301 is carried out to measure the current location of the user, the current azimuth angle as measured by executing the azimuth angle measuring module is inputted from the memory 42. At this time, the location as well as azimuth angle of the user immediately following the user's most recent image capture operation are measured as the current location and current azimuth angle respectively.

At Step S314a, the current azimuth angle is inputted from the memory 42. Next, at Step S314b, the tourist information, from amongst the plurality of azimuth angle specific tourist information items as correlated with the one final reference area as acquired at preceding Step S314 or S317, to which an azimuth angle which is closest to the current azimuth angle is allocated is extracted as the most suitable tourist information.

Thereafter, at Step S315, the most suitable tourist information thus extracted is displayed onto the screen 50 of the terminal 100 as tourist information reflecting both the current location as well as the current azimuth angle.

The foregoing detailed description is merely illustrative of some exemplary embodiments of the present invention based on the accompanying drawings and various modifications and improvements can be made by those skilled in the art starting from the invention as described in the "Disclosure of the Invention".

What is claimed is:

1. A method for retrieving tourist information based on a user's current location, comprising:

extracting, by a processor, a reference area, from a plurality of reference areas, that includes the user's current location, the plurality of reference areas being arranged as a plurality of diagrams superimposed on a plurality of target objects on a map as correlated with a plurality of tourist information items, wherein the plurality of reference areas are defined by a location, a shape and a size of an area on the map which reflect geographical attributes of the plurality of target objects as well as attributes different from the geographical attributes; and providing, by the processor, to a user, a tourist information item, from the plurality of tourist information items, that corresponds to the extracted reference area, wherein the extracted reference area is either in an inclusion relationship or non-inclusion relationship with other reference area(s) on the map, the inclusion relationship or non-inclusion relationship being a relationship of geometrically including or not including, respectively, the other reference area(s);

if there is more than one reference area that includes the user's current location:

the extraction includes extracting the more than one reference areas as temporary reference areas, and extracting the temporary reference area with the smallest size of area, from the more than one extracted reference areas, as a final reference area; and the providing, to the user, includes providing, to the user, the tourist information item that corresponds to the final reference are:

the current location is defined by a degree of longitude $x_{user}$, and a degree of latitude $y_{user}$ on the map;

each of the plurality of reference areas has a rectangular or square shape as an approximate two-dimensional figure and is defined by two sides parallel to the longitudinal direction x and two sides parallel to the latitudinal direction y on the map;

each of the plurality of reference areas is geometrically defined by one degree of longitude and latitude ($x_1$, $y_1$) and another degree of longitude and latitude ($x_2$, $y_2$) of a pair of diagonal positions in a corresponding rectangle; and the extraction includes extracting the reference area as a reference area including a current location, from amongst the plurality of reference areas, that has a degree of longitude $x_{user}$ found within a longitudinal direction range (from $x_1$ to $x_2$) of the reference area, and a degree of latitude $y_{user}$ found within a latitudinal direction range (from y1 to y2) of the reference area.

2. The method for retrieving tourist information according to claim 1, wherein the inclusion relationship does not include a partial inclusion relationship, which is when one reference area partially overlaps geometrically with another reference area(s).

3. The method for retrieving tourist information according to claim 1, wherein the inclusion relationship does not include a partial inclusion relationship, which is when one reference area partially overlaps geometrically with another reference area(s), the extraction includes extracting more than one reference areas including the current location as temporary reference areas, from the plurality of reference areas, the degrees, of longitude and latitude $(x_1, y_1)$ and (x2, y2) showing a pair of diagonal positions in a corresponding rectangle in each of the temporary reference areas is employed to calculate the respective size of each of the temporary reference areas, a temporary reference area with a smallest calculated size is selected as the final reference area from the temporary reference areas, and the providing, to the user, includes providing, to the user, the tourist information item, from the plurality of tourist information items, that corresponds to the final reference area.

4. A tourist information retrieval device for retrieving tourist information based on a user's current location, comprising:

a processor programmed to:

extract a reference area, from a plurality of reference areas, that includes the user's current location, the plurality of reference areas being arranged as a plurality of diagrams superimposed on a plurality of target objects on a map as correlated with a plurality of tourist information items, wherein the plurality of reference areas are defined by a location, a shape and a size of an area on the map which reflect the geographical attributes of the plurality of target objects as well as attributes other than the geographical attributes; and provide, to a user, a tourist information item, from the plurality of tourist information items, that corresponds to the extracted reference area, wherein the extracted reference area is either in an inclusion relationship or non-inclusion relationship with other reference area(s) on the map, the inclusion relationship or non-inclusion relationship being a relationship of geometrically including or not including, respectively, the other reference area(s);

if there is more than one reference area that includes the user's current location:

the extraction includes extracting each of the more than one reference areas as temporary reference areas, and extracting the temporary reference area with the smallest size of area as a final reference area; and the providing, to the user, includes providing, to the user, the tourist information item that corresponds to the final reference area;

the current location is defined by a degree of longitude $x_{user}$ and a degree of latitude $y_{user}$ on the map;

each of the plurality of reference areas has a rectangular or square shape as an approximate two-dimensional figure and is defined by two sides parallel to the longitudinal direction x and two sides parallel to the latitudinal direction y on the map;

each of the plurality of reference areas is geometrically defined by one degree of longitude and latitude $(x_1, y_1)$ and another degree of longitude and latitude $(x_2, y_2)$ of a pair of diagonal positions in a corresponding rectangle; and the extraction includes extracting the reference area as a reference area including a current location, from amongst the plurality of reference areas, that has a degree of longitude $x_{user}$ found within a longitudinal direction range (from $x_1$ to $x_2$) of the reference area and a degree of latitude $y_{user}$ found within a latitudinal direction range (from y1 to y2) of the reference area.

5. The tourist information retrieval device according to claim 4, wherein the inclusion relationship does not include a partial inclusion relationship, which is when one reference area partially overlaps geometrically with another reference area(s), the extraction includes extracting more than one reference areas including the current location as temporary reference areas, from the plurality of reference areas, the degrees of longitude and latitude $(x_1, y_1)$ and (x2, y2) showing a pair of diagonal positions in a corresponding rectangle in each of the temporary reference areas is employed to calculate the respective size of each of the temporary reference areas, a temporary reference area with a smallest calculated size is selected as the final reference area from the temporary reference areas, and the providing, to the user, includes providing, to the user, the tourist information item, from the plurality of tourist information items, that corresponds to the final reference area.

* * * * *